US012609797B2

(12) United States Patent   (10) Patent No.:    US 12,609,797 B2

Hirzallah et al.   (45) Date of Patent:       Apr. 21, 2026

(54) COLLECTING DATA FOR TRAINING A WIRELESS DEVICE POSITIONING MODEL

(71) Applicant: QUALCOMM Incorporated, San Diego, CA (US)

(72) Inventors: Mohammed Ali Mohammed Hirzallah, San Diego, CA (US); Srinivas Yerramalli, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 18/295,794

(22) Filed: Apr. 4, 2023

(65) Prior Publication Data

US 2024/0340136 A1      Oct. 10, 2024

(51) Int. Cl.
H04W 24/10        (2009.01)
H04L 5/00        (2006.01)

(52) U.S. Cl.
CPC ........... H04L 5/0051 (2013.01); H04W 24/10 (2013.01)

(58) Field of Classification Search
CPC .... H04L 5/0051; H04W 24/10; H04W 88/18; H04W 64/00; G01S 5/0236
See application file for complete search history.

(56) References Cited

U.S. PATENT DOCUMENTS

2022/0046386 A1   2/2022  Sundararajan et al.
2024/0295625 A1 *  9/2024  Hasegawa ............. G01S 5/0263

FOREIGN PATENT DOCUMENTS

WO      2022155244 A2    7/2022

OTHER PUBLICATIONS

Apple Inc: "On Other Aspects on AI/ML for Positioning Accuracy Enhancement", 3GPP TSG RAN WG1 #112, R1-2301342, Type Discussion, FS_NR_AIML_AIR, 3rd Generation Partnership Project, Mobile Competence Centre, 650, Route Des Lucioles, F-06921 Sophia-Antipolis Cedex, France, vol. 3GPP RAN 1, No. Athens, Greece, Feb. 27, 2023-Mar. 3, 2023, Feb. 17, 2023, 15 Pages, XP052248477, p. 11, paragraph 4 Use cases and potential spec impact—p. 13, figures 2-4, p. 1, paragraph 1 Introduction.

(Continued)

*Primary Examiner* — Chuong A Ngo
(74) *Attorney, Agent, or Firm* — Procopio, Cory, Hargreaves & Savitch LLP

(57)          ABSTRACT

A wireless device may receive a set of positioning reference signals (PRSs). The wireless device may measure the set of PRSs. The wireless device may output at least one of a set of measurements based on the measured set of PRSs, a set of labels associated with the measured set of PRSs, or assistance information associated with the measured set of PRSs for training a positioning model. In one aspect, the wireless device may transmit, to a network entity, the set of measurements for the positioning model. In another aspect, the wireless device may include the positioning model. The wireless device may train the positioning model based on at least one of the set of measurements, the set of labels, or the assistance information. The wireless device may include a user equipment (UE) or a positioning reference unit (PRU). The network entity may include a location management function (LMF).

30 Claims, 16 Drawing Sheets

(56)     References Cited

OTHER PUBLICATIONS

International Search Report and Written Opinion—PCT/US2024/021500—ISA/EPO—Jun. 20, 2024.
Moderator (VIVO): "FL Summary #2 of Other Aspects on AI/ML for Positioning Accuracy Enhancement", 3GPP TSG RAN WG1 Meeting #11, R1-2301996, Type Discussion, FS_NR_AIML_AIR, 3rd Generation Partnership Project, Mobile Competence Centre, 650, Route Des Lucioles, F-06921 Sophia-Antipolis Cedex, France, vol. 3GPP RAN 1, No. Athens, Greece, Feb. 27, 2023-Mar. 3, 2023, Feb. 28, 2023, 90 pages, XP052249126, The whole document.

* cited by examiner $\varPhi$ = Azimuth angle of departure (A-AoD)
$\theta$ = Zenith angle of departure (Z-AoD)
$\rho$ = Distance
$\varPhi'$ = Azimuth angle of arrival (A-AoA)
$\theta'$ = Zenith angle of arrival (Z-AoA)

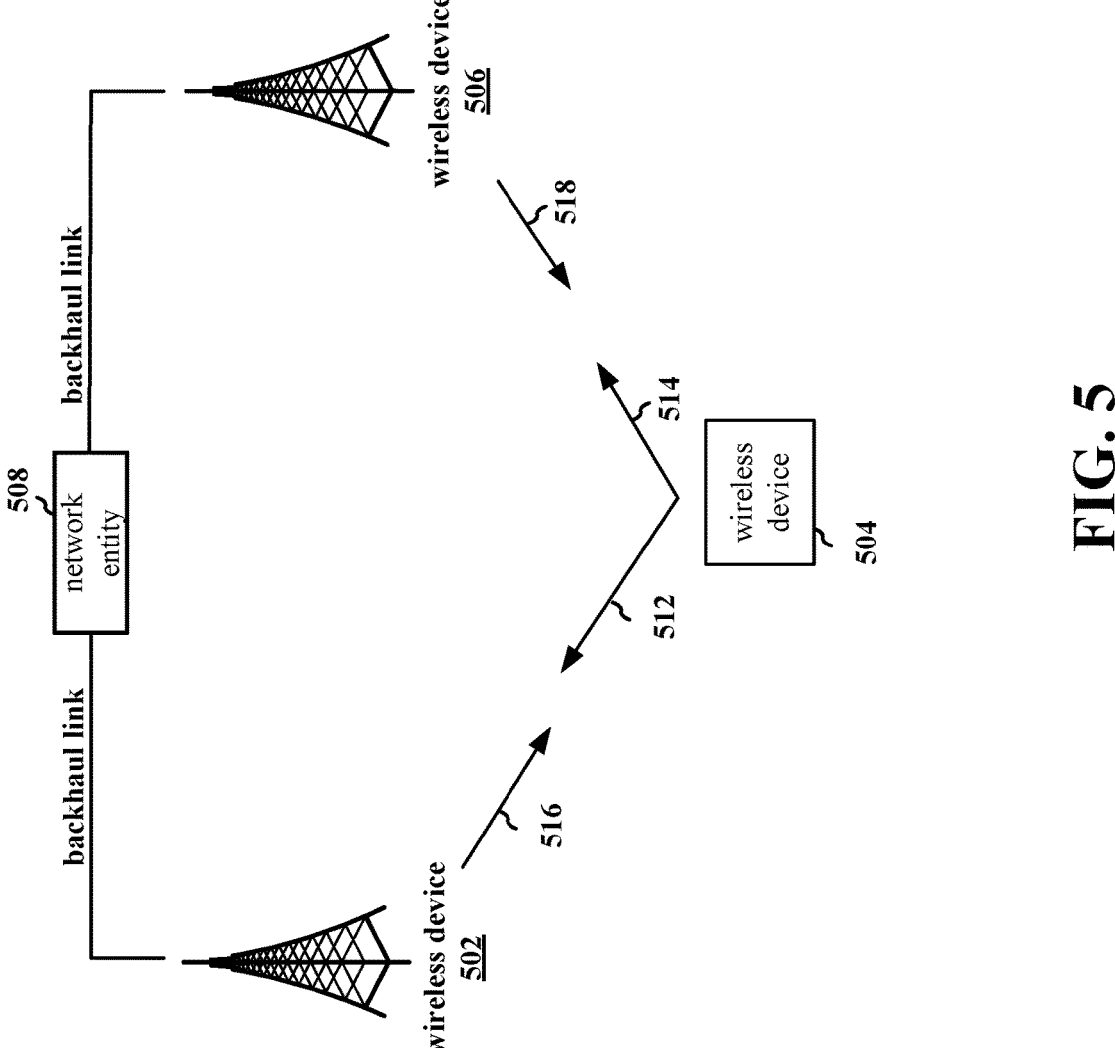
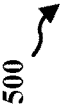
FIG. 5

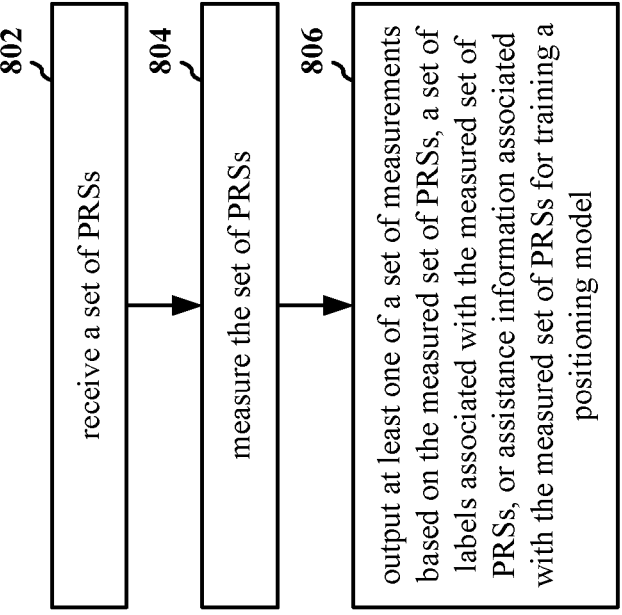
802 receive a set of PRSs
804 measure the set of PRSs
806 output at least one of a set of measurements based on the measured set of PRSs, a set of labels associated with the measured set of PRSs, or assistance information associated with the measured set of PRSs for training a positioning model
800
FIG. 8

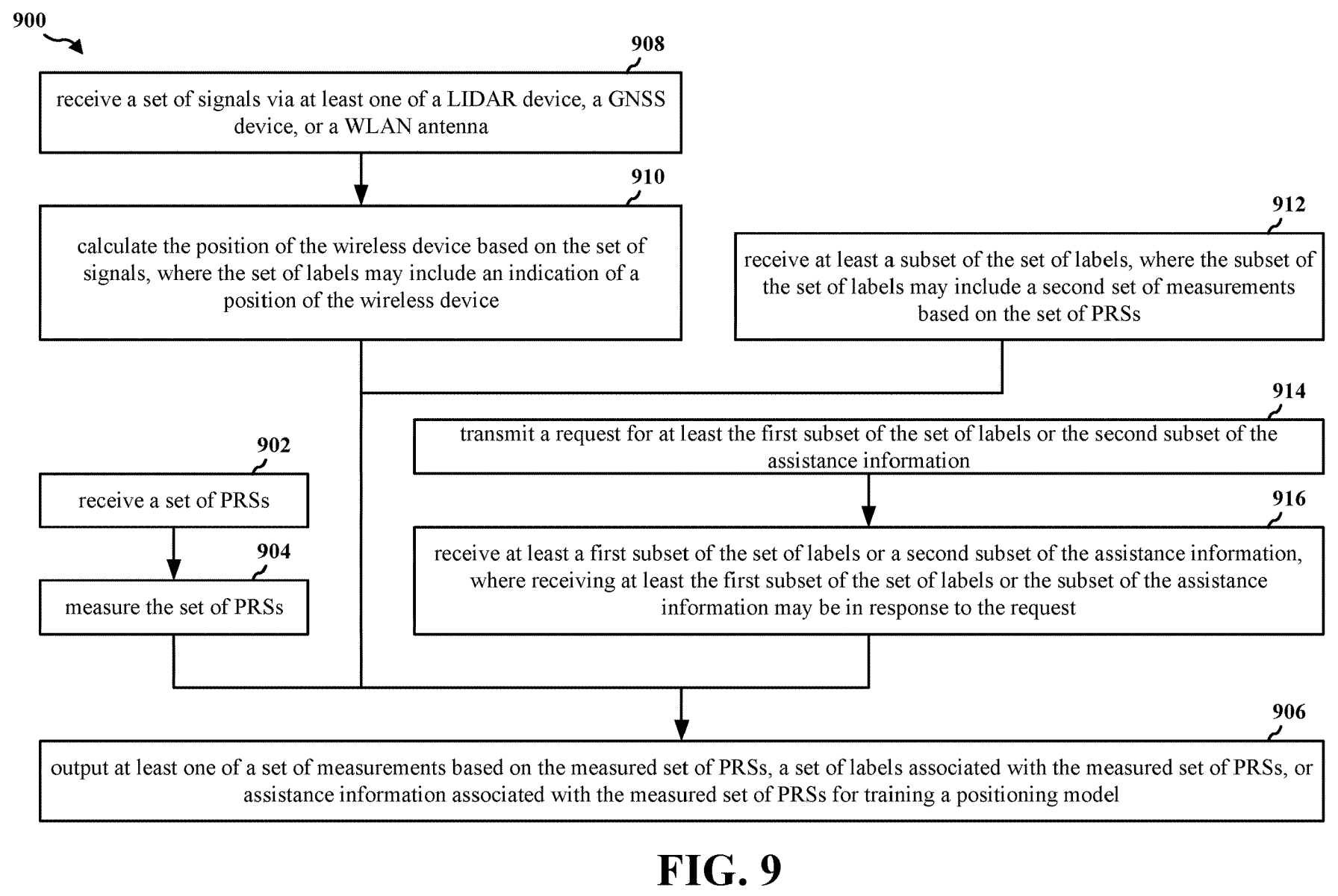

900

908 receive a set of signals via at least one of a LIDAR device, a GNSS device, or a WLAN antenna

910 calculate the position of the wireless device based on the set of signals, where the set of labels may include an indication of a position of the wireless device

912 receive at least a subset of the set of labels, where the subset of the set of labels may include a second set of measurements based on the set of PRSs

914 transmit a request for at least the first subset of the set of labels or the second subset of the assistance information

916 receive at least a first subset of the set of labels or a second subset of the assistance information, where receiving at least the first subset of the set of labels or the subset of the assistance information may be in response to the request

902 receive a set of PRSs

904 measure the set of PRSs

906 output at least one of a set of measurements based on the measured set of PRSs, a set of labels associated with the measured set of PRSs, or assistance information associated with the measured set of PRSs for training a positioning model

FIG. 9

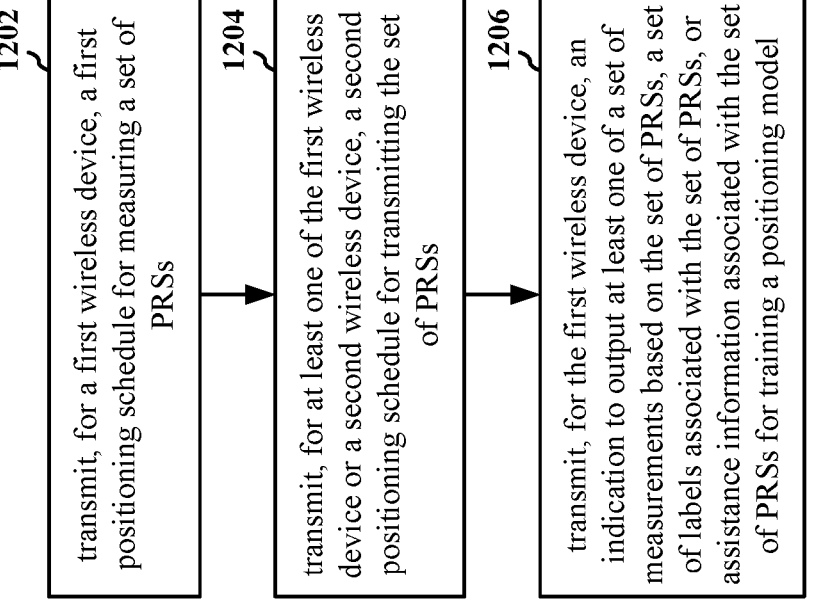

1202 transmit, for a first wireless device, a first positioning schedule for measuring a set of PRSs

1204 transmit, for at least one of the first wireless device or a second wireless device, a second positioning schedule for transmitting the set of PRSs

1206 transmit, for the first wireless device, an indication to output at least one of a set of measurements based on the set of PRSs, a set of labels associated with the set of PRSs, or assistance information associated with the set of PRSs for training a positioning model

COLLECTING DATA FOR TRAINING A WIRELESS DEVICE POSITIONING MODEL

TECHNICAL FIELD

The present disclosure relates generally to communication systems, and more particularly, to a system for performing positioning on wireless devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless device. The apparatus may include a user equipment (UE), a network node, or a positioning reference unit (PRU). The apparatus may receive a set of positioning reference signals (PRSs). The apparatus may measure the set of PRSs. The apparatus may output at least one of a set of measurements based on the measured set of PRSs, a set of labels associated with the measured set of PRSs, or assistance information associated with the measured set of PRSs for training a positioning model.

In an aspect of the disclosure, a method, a computer-readable medium, and an apparatus are provided. The apparatus may include a network entity. The network entity may include a location management function (LMF) or a set of location servers. The apparatus may transmit, for a first wireless device, a first positioning schedule for measuring a set of PRSs. The apparatus may transmit, for at least one of the first wireless device or a second wireless device, a second positioning schedule for transmitting the set of PRSs. The apparatus may transmit, for the first wireless device, an indication to output at least one of a set of measurements based on the set of PRSs, a set of labels associated with the set of PRSs, or assistance information associated with the set of PRSs for training a positioning model.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of a network entity coordinating a plurality of base stations to perform positioning with a wireless device.

FIG. 8 is a flowchart of a method of wireless communication.

FIG. 9 is a flowchart of a method of wireless communication.

FIG. 12 is a flowchart of a method of wireless communication.

DETAILED DESCRIPTION

Figure 1:
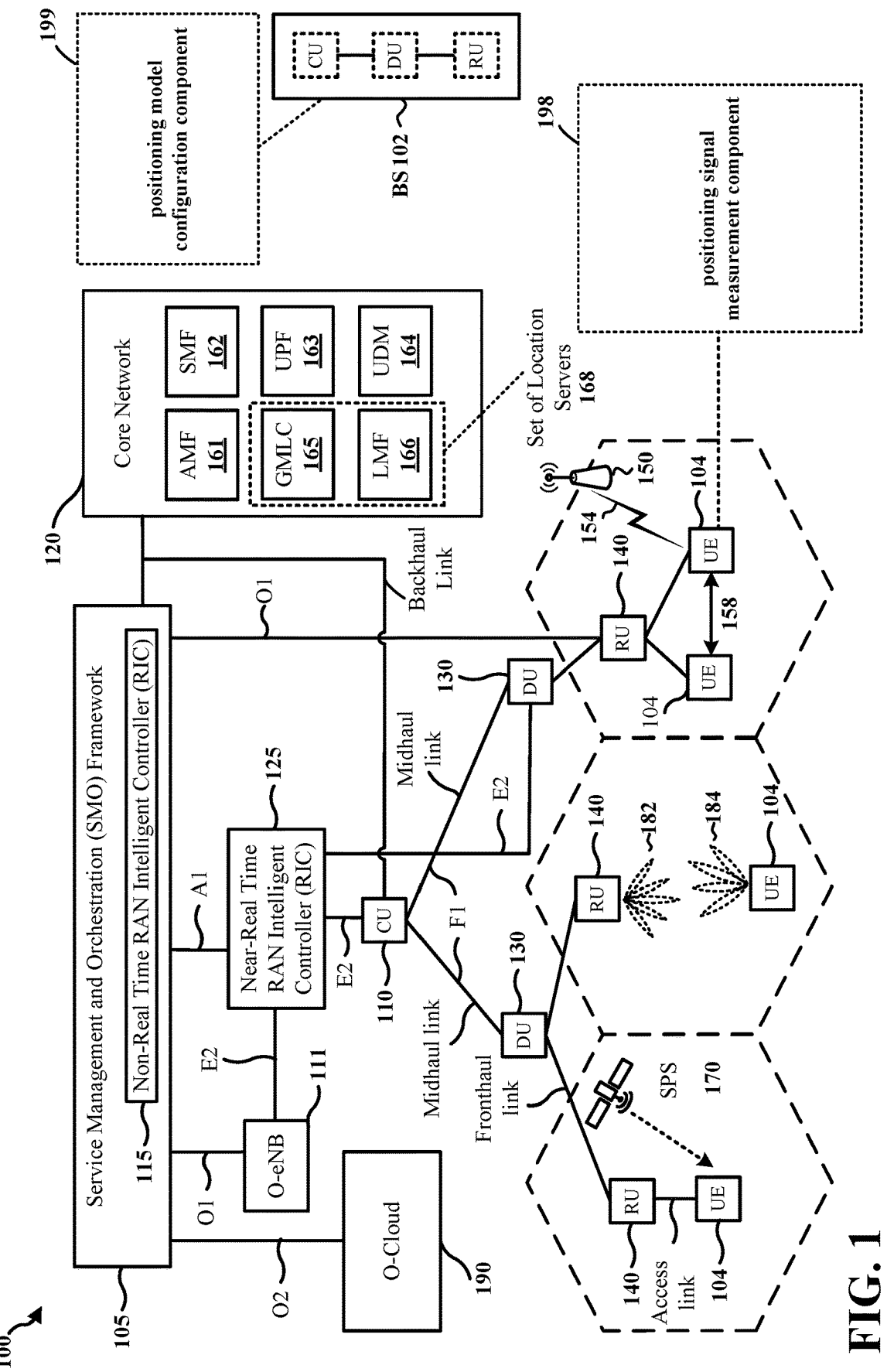
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless communication and more particularly to positioning for wireless devices. Some aspects more specifically relate to training positioning models for use in positioning for wireless devices. In some examples, a wireless device may be used to collect data for training a positioning model. The model may be an artificial intelligence (AI)/machine learning (ML) (AI/ML or AIML) positioning model trained using a set of inputs and a set of expected outputs, or labels. Once the positioning model has been trained, the positioning model may be used to calculate a set of outputs based on a set of new inputs. The wireless device may include a user equipment (UE), a network node, or a positioning reference unit (PRU). The wireless device may receive a set of positioning reference signals (PRSs). The wireless device may measure the set of PRSs. The wireless device may output at least one of a set of measurements based on the measured set of PRSs, a set of labels associated with the measured set of PRSs, or assistance information associated with the measured set of PRSs for training a positioning model. In some examples, a network entity may configure a wireless device to collect data for a positioning model. The network entity may include a location management function (LMF) or a set of location servers. The network entity may transmit, for a first wireless device, a first positioning schedule for measuring a set of PRSs. The network entity may transmit, for at least one of the first wireless device or a second wireless device, a second positioning schedule for transmitting the set of PRSs. The network entity may transmit, for the first wireless device, an indication to output at least one of a set of measurements based on the set of PRSs, a set of labels associated with the set of PRSs, or assistance information associated with the set of PRSs for training a positioning model.

Specifications for some wireless devices may not support signaling for collecting training data to train positioning models that depend on measurements of positioning signals transmitted from a network node (e.g., PRSs, channel state information reference signals (CSI-RSs)). Such wireless devices may also not be configured to provide any labeling assistance. In some aspects, a wireless device, such as UE or a PRU, may be configured to collect training data for training a positioning model based on measurements of positioning signals received by the wireless device. The training data include downlink (DL) based measurements, such as reference signal time difference (RSTD) measurements, reference signal received power (RSRP) measurements, reference signal received power path (RSRPP) measurements, angle of departure (AoD) measurements, and/or line-of-sight (LOS) identification measurements. The training data may include enhanced measurements, such as soft information (e.g., likelihood, probability, range, or distribution) of RSTD measurements, soft information of RSRP measurements, soft information of RSRPP measurements, soft information of AoD measurements, beam path information, LOS phase information, additional beam path phase information, and/or a joint composition of DL-based measurements. The training data may include channel impulse response (CIR) measurements, channel frequency response (CFR) measurements, and/or power delay profile (PDP) measurements captured at the wireless device. In some aspects, the training data labels used to train the positioning model may include a known PRU location, a location of a UE obtained using a non-radio access technology (non-RAT) method, a location of a UE derived by an LMF, intermediate labels (labels used to calculate a location of the wireless device) based on reported measurements by the wireless device or a network node (e.g., a transmission reception point (TRP)), and/or intermediate labels obtained from an LMF (e.g., calculated by the LMF or received by the LMF from other wireless devices). In some aspects, the wireless device may provide assistance data to an LMF or vice versa. The assistance information may include reference signal resources used for reported measurements, enhanced timestamps of reference signal resources, UE (UE/PRU to LMF) or gNB/TRP (LMF to UE/PRU) proprietary information such as positioning signal beam information. In some aspects, the wireless device may request from a network entity (or vice versa) to assist in training data collection as part of a Long Term Evolution (LTE) positioning protocol (LPP) annex (LPPa) framework based on standard positioning procedures or a new dedicated procedure for collecting training data. In some aspects, training data collection sessions between a network entity and the wireless device may be initiated by either the wireless device or the network entity, and may be included in a session capability exchange, a session configuration exchange, a session initiation message, a session error message, and/or a session pause/termination message.

Particular aspects of the subject matter described in this disclosure may be implemented to realize one or more of the following potential advantages. In some examples, by configuring a wireless device to collect and output training data for downlink (e.g., PRS) positioning signals, the training data may be used to train a positioning model for improving the accuracy of positioning at the wireless device. The described techniques can be used to accurately perform positioning at a wireless device based on measurements and assistance information of downlink positioning signals. The described techniques enable a wireless device to report measurements to a network entity, receive labeling assistance for training a positioning model, and exchange assistance information with the network entity to improve the accuracy of the positioning model.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include an AP 150 (e.g., a Wi-Fi AP) in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming.

The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDoA), UL time difference of arrival (UL-TDoA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a positioning signal measurement component 198 that may be configured to receive a set of positioning reference signals (PRSs). The positioning signal measurement component 198 may be configured to measure the set of PRSs. The positioning signal measurement component 198 may be configured to output at least one of a set of measurements based on the measured set of PRSs, a set of labels associated with the measured set of PRSs, or assistance information associated with the measured set of PRSs for training a positioning model. In certain aspects, the base station 102 may have a positioning model configuration component 199 that may be configured to transmit, for a first wireless device, a first positioning schedule for measuring a set of PRSs. The base station 102 may include a network entity, such as the LMF 166 or the one or more location servers 168. The positioning model configuration component 199 may be configured to transmit, for at least one of the first wireless device or a second wireless device, a second positioning schedule for transmitting the set of PRSs. The positioning model configuration component 199 may be configured to transmit, for the first wireless device, an indication to output at least one of a set of measurements based on the set of PRSs, a set of labels associated with the set of PRSs, or assistance information associated with the set of PRSs for training a positioning model. The positioning model configuration component 199 may configure a positioning occasion between the UE 104 and a base station, such as the base station 102, such that the UE 104 receives a set of PRSs from the base station. The positioning signal measurement component 198 may measure the set of PRSs, and may use the measurements to train a positioning model at the UE or at a network entity. The positioning signal measurement component 198 may transmit a set of labels and/or assistance information to the network entity for training the positioning model at the network entity. The positioning model configuration component 199 may transmit a set of labels and/or assistance information to the UE for training the positioning model at the UE.

Figures 2A, 2B, 2C, 2D:
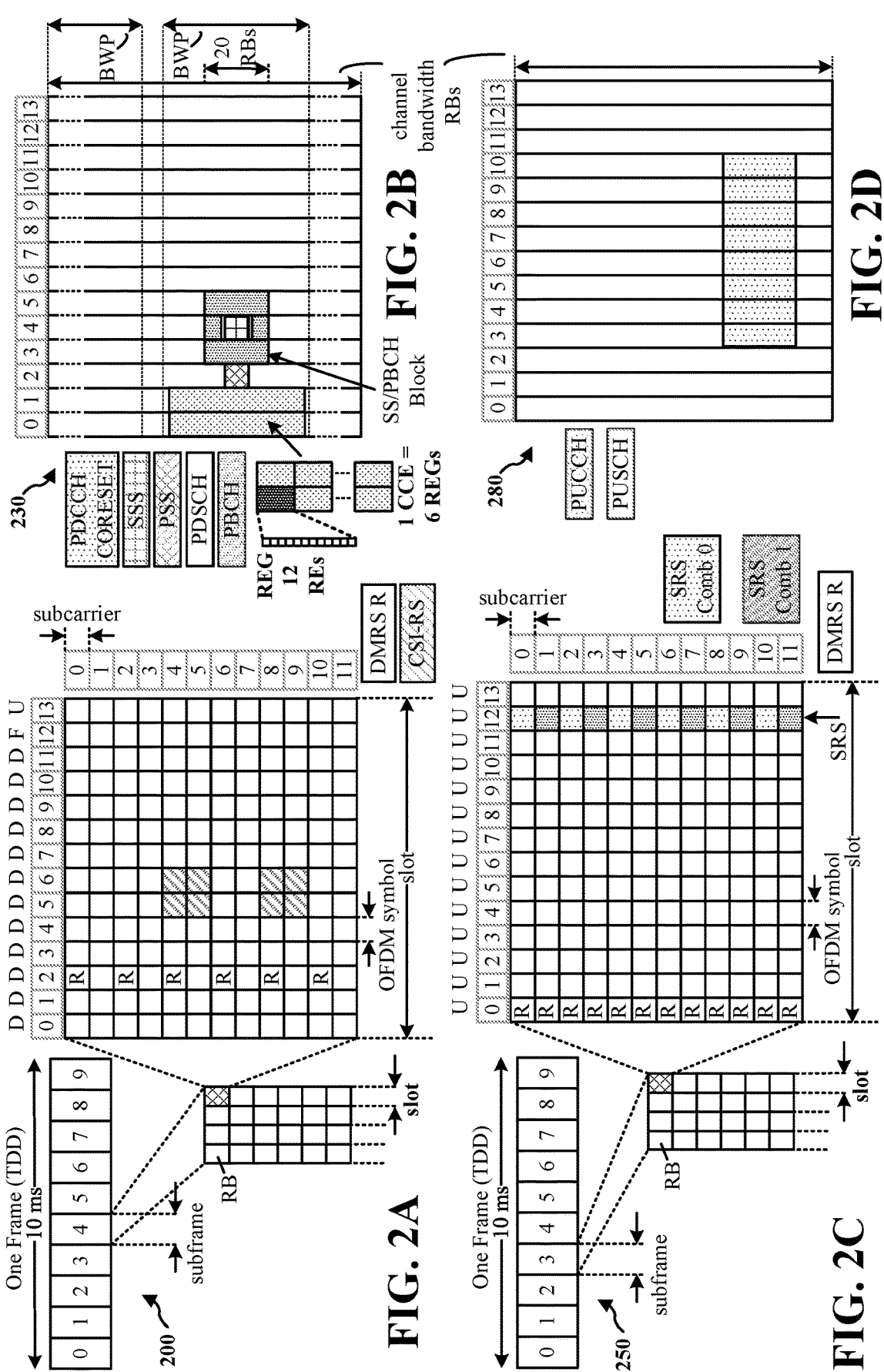
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A. 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu$ *15 kHz, where u is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
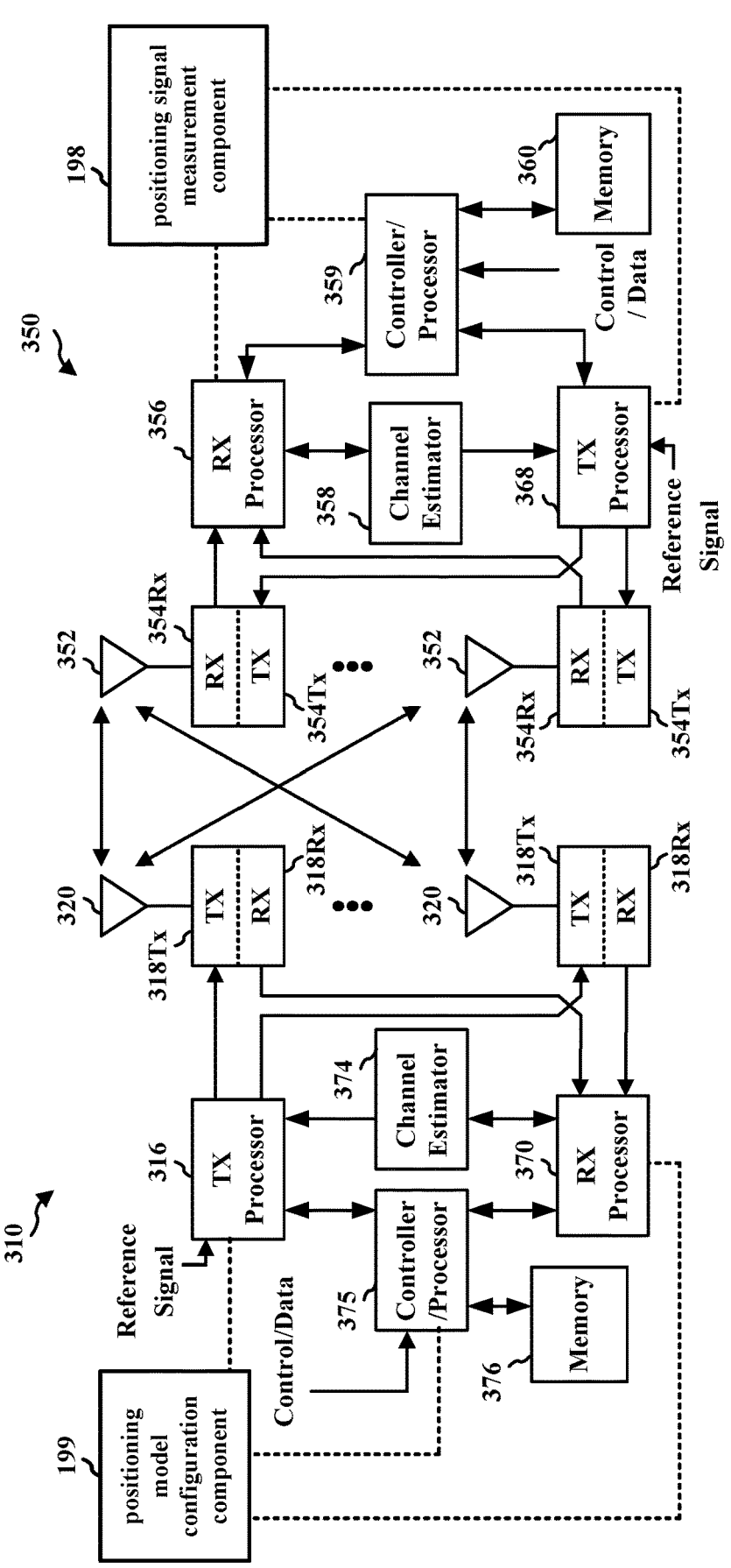
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning signal measurement component 198 of FIG. 1.

At least one of the TX processor 316, the RX processor 370, and the controller/processor 375 may be configured to perform aspects in connection with the positioning model configuration component 199 of FIG. 1.

Figure 4:
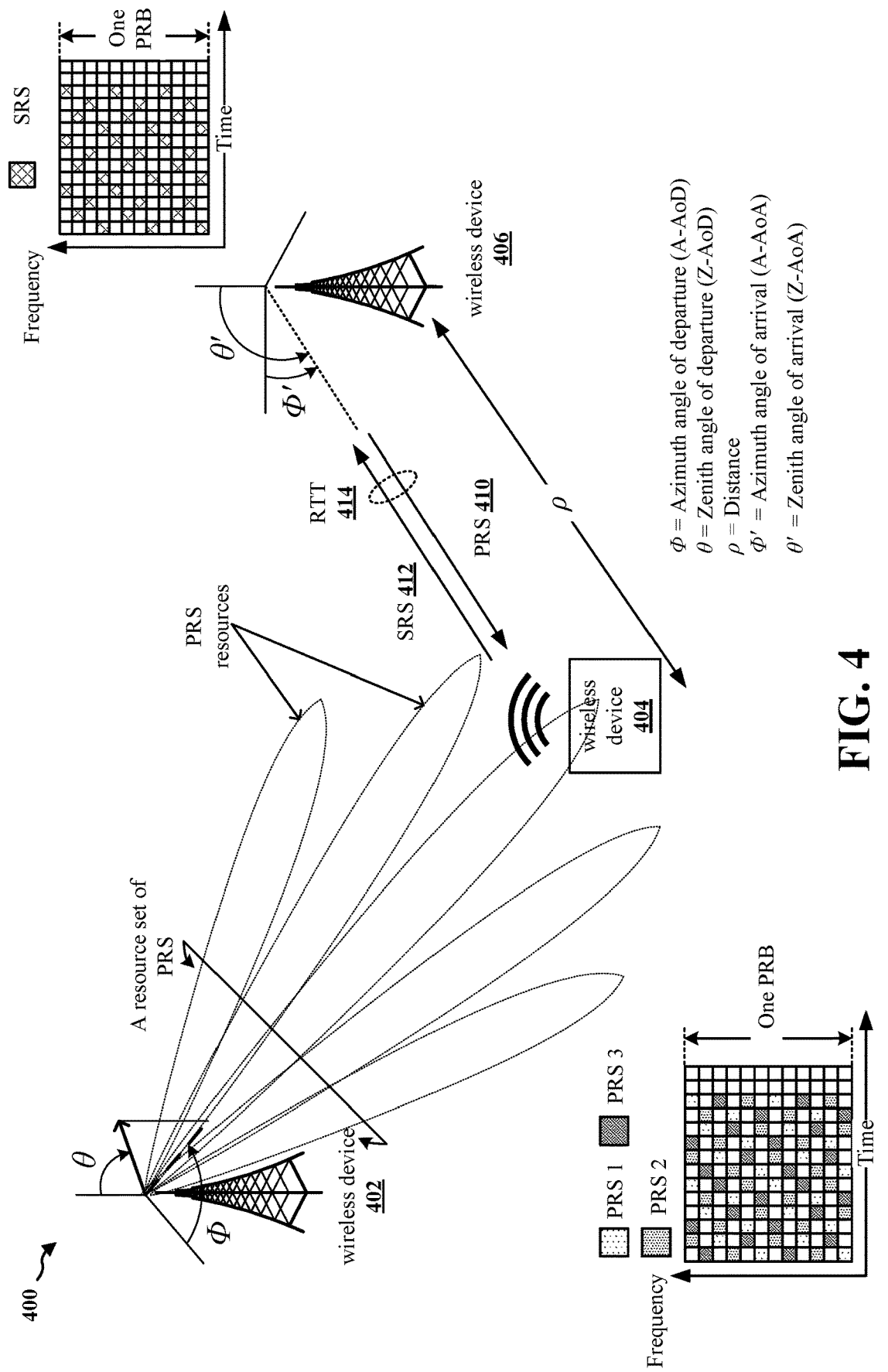
FIG. 4 is a diagram illustrating an example of positioning based on reference signal measurements.

FIG. 4 is a diagram 400 illustrating an example of positioning based on reference signal measurements. The wireless device 402 may be a UE, a base station, or a positioning reference unit (PRU). The wireless device 404 may be a UE, a base station, or a PRU. The wireless device 406 may be a UE, a base station, or a PRU. The wireless device 402 may be referred to as a positioning target wireless device, whose location may be calculated based on measurements of one or more reference signals. The wireless device 404 and the wireless device 406 may be referred to as positioning neighbor wireless devices, whose locations may be known, which may be used to calculate the location of the wireless device 402. The wireless device 404 may transmit SRS 412 at time $T_{SRS\_TX}$ to the wireless device 406. The wireless device 404 may receive positioning reference signals (PRS) 410 at time $T_{PRS\_RX}$ from the wireless device 406. The SRS 412 may be an UL-SRS. The PRS 410 may be a DL-PRS. In some aspects, the wireless device 402 may be a TRP and the wireless device 406 may be a TRP, which may be both configured to transmit DL-PRS to the wireless device 404. The wireless device 404 may be a UE configured to transmit UL-SRS to the wireless device 402 and the wireless device 406.

The wireless device 406 may receive the SRS 412 at time $T_{SRS\_RX}$ from the wireless device 404 and transmit the PRS 410 at time $T_{PRS\_TX}$ to the wireless device 404. The wireless device 404 may receive the PRS 410 before transmitting the SRS 412. The wireless device 404 may transmit the SRS 412 before receiving the PRS 410. The wireless device 404 may transmit the SRS 412 in response to receiving the PRS 410. The wireless device 406 may transmit the PRS 410 in response to receiving the SRS 412. A positioning server (e.g., location server(s) 168), the wireless device 404, or the wireless device 406 may determine the round-trip-time (RTT) 414 based on $\|T_{SRS\_RX}-T_{PRS\_TX}\|-\|T_{SRS\_TX}-T_{PRS\_RX}\|$. Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX}-T_{PRS\_TX}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

FIG. 5 is a diagram 500 illustrating a network entity 508 that may be configured to coordinate a wireless device 502 and a wireless device 506 to perform positioning with a wireless device 504. The location of the wireless device 502 and the wireless device 506 may be known. The wireless device 502 may be a base station or a TRP. The wireless device 506 may be a base station or a TRP. The wireless device 504 may be a UE or a PRU. The network entity 508 may be connected to the wireless device 502 and the wireless device 506 via a physical link, for example a backhaul link or a midhaul link. The network entity 508 may be an LMF or a set of location servers.

To perform positioning, the network entity 508 may configure the wireless devices to transmit positioning signals at one another. For example, the wireless device 504 may transmit the set of positioning signals 512 at the wireless device 502. The set of positioning signals 512 may be a set of SRSs. The wireless device 502 may measure the set of positioning signals 512. The wireless device 502 may transmit the set of positioning signals 516 at the wireless device 504. The set of positioning signals 516 may be a set of PRSs. The wireless device 504 may measure the set of positioning signals 516. The wireless device 504 may transmit a set of positioning signals 514 at the wireless device 506. The set of positioning signals 514 may be a set of SRSs. The wireless device 506 may measure the set of positioning signals 514. The wireless device 506 may transmit a set of positioning signals 518 at the wireless device 504. The set of positioning signals 518 may be a set of PRSs. The wireless device 504 may measure the set of positioning signals 518. One or more of the wireless devices may measure the received positioning signals to calculate a positioning measurement that may be used to calculate a location of the wireless device 504, or may be used to calculate a position or a location of the wireless device 504. For example, if the location of the wireless device 502 and the location of the wireless device 506 are known, the location of the wireless device 504 may be calculated based on a RTT between the wireless device 502 and the wireless device 504, and a RTT between the wireless device 504 and the wireless device 506. In another example, the wireless device 504 may calculate an angle of arrival (AoA) or an angle of departure (AoD) of the set of positioning signals 516, and may calculate an AoA or an AoD of the set of positioning signals 518. The calculated AoAs and/or AoDs may be used to calculate a position of the wireless device 504 if the location of the wireless device 502 and the location of the wireless device 506 are also known.

In some aspects, a positioning model may be used to calculate one or more positioning metrics based on the measurements. For example, based on the measurements of positioning signals, a positioning model may calculate a location of the wireless device 504 or an intermediate measurement that may be used to calculate the location of the wireless device 504. A positioning model may be trained using artificial intelligence (AI)/machine learning (ML) (AI/ML or AIML), based on a set of inputs (e.g., measurements of positioning signals, assistance information associated with the positioning signals) and a set of labels. A label may be a calculated, derived, or given (i.e., known) expected result associated with a set of inputs, such as a location of a wireless device 504 or an intermediate measurement (e.g., a timing measurement, an angle measurement, a LOS identification) that may be used to calculate the location of the wireless device 504. A set of inputs and a set of labels may be used for generating and/or training a positioning model using AI/ML.

When training a positioning model, measurements of positioning signals as inputs, clean or noisy labels (clean labels may have a quality metric greater or equal to a threshold, noisy labels may have a quality metric less than or equal to the threshold) as expected outputs, and training data assistance information as inputs or expected outputs.

The training data for training the positioning model may include measurements based on downlink signals to the wireless device 504, such as PRSs. The measurements may include DL-based basic measurements, such as RSTD measurements, RSRP measurements, RSRPP measurements, AoD measurements, and/or LOS identification measurements. A LOS identification measurement may be a measurement that identifies whether or not there exists a direct LOS path between a wireless device receiving the positioning signal and a wireless device transmitting the positioning signal. The measurements may include DL-based enhanced measurements, such as soft information (e.g., likelihood, probability, range, or distribution) of RSTD measurements, soft information of RSRP measurements, soft information of RSRPP measurements, soft information of AoD measurements, beam path information, LOS phase information, additional beam path phase information, and/or a joint composition of DL-based basic measurements. The training data may include DL-based novel measurements, such as CIR measurements, CFR measurements, and/or PDP measurements captured at the wireless device.

A wireless device may transmit assistance information to an LMF or a training entity along with measurements and/or labels for training a positioning model. The assistance information may include, for example, a BWP used for a PRS, a number of TRPs transmitting sets of PRSs at the wireless device, beam information, and/or PRS configuration information. The assistance information may include an indication of reference signal resources used by the wireless device to derive and/or calculate the positioning signal measurements (e.g., frame number, slot index, orthogonal frequency division multiplexing (OFDM) symbol, hyper frame number). The assistance information may include enhanced timestamping of reference signal resources used by the wireless device to derive and/or calculate the positioning signal measurements (e.g., coordinated universal time (UTC) timing). The assistance information may include proprietary information associated with the wireless device, such as UE-side beam information used to obtain measurements and/or calculate labels. The assistance information may include an indication of reference signal resources used to obtain, derive, and/or calculate the location of the wireless device using RAT methods (e.g., frame number, slot index, OFDM symbol, hyper frame number). The assistance information may include enhanced timestamping of reference signal resources used to obtain, derive, and/or calculate the location of the wireless device using any RAT or non-RAT methods (e.g., UTC timing). The wireless device may transmit such assistance information in response to a request to provide assistance information for training a positioning model.

A network entity (e.g., an LMF) may transmit assistance information to the wireless device or a training entity along with measurements and/or labels for training a positioning model. Such assistance information may include an indication of reference signal resources that the network entity or another wireless device used to obtain, derive, and/or calculate the location of the wireless device or intermediate labels using RAT methods (e.g., frame number, slot index, OFDM symbol, hyper frame number). The assistance information may include enhanced timestamping of reference signal resources that the network entity or another wireless device used to obtain, derive, and/or calculate the location of the wireless device or intermediate labels using RAT methods or non-RAT methods (e.g., UTC timing). The assistance information may include network node (e.g., gNB, TRP) proprietary information (e.g., TRP-side beam information) used by the network entity or another wireless device to obtain, derive, and/or calculate the location of the wireless device or intermediate labels. The network entity may obtain the labels (location of the wireless device or intermediate labels) by calculating the labels, or by receiving a transmission including at least some of the labels from another wireless device. The network entity may transmit such assistance information in response to a request to provide assistance information for training a positioning model.

The labels may include a known location of a wireless device (e.g., a location of a PRU known by an LMF), a location of a wireless device obtained using a non-RAT method (e.g., using an LIDAR sensor, a GNSS fix, a WLAN positioning method, other sensors at the wireless device), a location of a wireless device calculated using a RAT method (e.g., based on DL-TDoA, DL-AOD, multi-RTT, and/or a set of intermediate labels calculated based on RAT measurements. The labels may be calculated/obtained by the wireless device, or may be received from a network entity, such as an LMF. The LMF may calculate a label based on measurements/labels received from the wireless device, may calculate a label based on measurements/labels received from other wireless devices (e.g., other TRPs and/or other network nodes in a multi-RTT session), or may obtain a label from another wireless device and transmit it to a training entity for training a positioning model.

Some wireless devices may not support signaling for collecting training data to train positioning models based on measurements taken of downlink reference signals.

Some wireless devices may also not support transmitting certain labeling assistance information due to privacy limitations (e.g., a base station may not be configured to transmit its location or beam information to a first set of wireless devices, but may be configured to transmit its location or beam information to a second set of wireless devices). In some aspects, wireless devices may be configured to report training data measurements, a subset of assistance information, and/or labels to one another to support training positioning models based on downlink signals. In some aspects, a wireless device may request another wireless device to assist in training data collection. For example, the wireless device 504 may transmit a request to the network entity 508 to assist in training data collection as part of an LPPa framework. In some aspects, the wireless device 504 may request the network entity 508 to configure a positioning procedure (e.g., DL-TDoA, DL-AOD, multi-RTT) and in response the network entity 508 may provide labels and/or assistance information as part of configuring the requested positioning procedure. In some aspects, the wireless device 504 may request the network entity 508 to perform a dedicated procedure for collecting training data (e.g., as part of the LPPa framework for the wireless device). For example, the wireless device 504 may transmit an indication to the network entity 508 to train a positioning model for use by the wireless device 504 to calculate a location of the wireless device 504 or to calculate intermediate measurements that may be used to calculate a location of the wireless device 504. In another example, the network entity 508 may request the wireless device 504 to assist in training data collection as part of an LPPa framework. In some aspects, the network entity 508 may request the wireless device 504 to perform a positioning procedure (e.g., DL-TDoA. DL-AoD, multi-RTT) and in response the wireless device 504 may provide labels and/or assistance information as part of performing the requested positioning procedure. In some aspects, the network entity 508 may request the wireless device 504 to perform a dedicated procedure for collecting training data (e.g., as part of the LPPa framework for the wireless device). For example, the network entity 508 may transmit an indication to the wireless device 504 to provide measurements and assistance data to the network entity 508 or to another training entity (e.g., an over-the-top (OTT) server) to train a positioning model for use by the network entity 508 or the wireless device 504 to calculate a location of the wireless device 504 or to calculate intermediate measurements that may be used to calculate a location of the wireless device 504. In other words, training data collection sessions between a wireless device and a network entity may be initiated by the wireless device (e.g., a UE or a PRU may initiate the training data collection as part of LPPa signaling) or may be initiated by the network entity (e.g., an LMF may initiate the training data collection as part of LPPa signaling). A training data collection session between a wireless device and a network entity may be configured to enable the wireless device and the network entity to exchange assistance information as part of a session capability exchange, a session configuration exchange, a session initiation message, a session error message, a session pause message, and/or a session termination message.

In one aspect, a system may be configured to train a positioning model at the wireless device 504. For example, the wireless device 504 may have a positioning model configured to calculate a location of the wireless device 504 based on a set of inputs. The wireless device 504 may train the positioning model based on a calculated location of the wireless device 504 and a set of inputs, such as measurements of the set of positioning signals 516 received at the wireless device 504, measurements of the set of positioning signals 518 received at the wireless device 504, intermediate measurements calculated at the wireless device 504, intermediate measurements calculated at the wireless device 502, intermediate measurements calculated at the wireless device 506, intermediate measurements calculated at the network entity 508, assistance information associated with the set of positioning signals 516 or the set of positioning signals 512 at the wireless device 502, assistance information associated with the set of positioning signals 518 or the set of positioning signals 514 at the wireless device 502, and/or assistance information associated with the set of positioning signals 516, the set of positioning signals 512, the set of positioning signals 518, or the set of positioning signals 514 at the network entity 508. The location of the wireless device 504 may be calculated at the network entity 508, the wireless device 502, the wireless device 506, or the wireless device 504. For example, the network entity 508 may receive measurements from the wireless device 502, the wireless device 506, and the wireless device 504 and may calculate a position of the wireless device 504, or the wireless device 504 may calculate its position using a set of signals received by a LIDAR device, a GNSS device, or a WLAN antenna. After the positioning model is trained, the wireless device 502 may transmit the set of positioning signals 516 at the wireless device 504 and the wireless device 506 may transmit the set of positioning signals 518 at the wireless device

504. The wireless device 504 may measure the set of positioning signals 516 and the set of positioning signals 518. The wireless device 504 may receive assistance information from the wireless device 502, the wireless device 504, and/or the network entity 508. The wireless device 504 may use the positioning model to calculate its location, and may transmit its location to the network entity 508. In some aspects, the wireless device 504 may be used to generate a positioning model that may be used by another UE or PRU in an area about where the wireless device 504 was trained (e.g., a zone, a similar environment).

In another example, the wireless device 504 may have a positioning model configured to calculate an intermediate measurement that may be used to calculate a position of the wireless device 504 based on a set of inputs. The wireless device 504 may train the positioning model based on a calculated intermediate measurement (e.g., timing measurements, angle measurements, LOS identification) and a set of inputs, such as measurements of the set of positioning signals 516 received at the wireless device 504, measurements of the set of positioning signals 518 received at the wireless device 504, intermediate measurements calculated at the wireless device 504, intermediate measurements calculated at the wireless device 502, intermediate measurements calculated at the wireless device 506, intermediate measurements calculated at the network entity 508, assistance information (e.g., BWP, number of TRPs, beam information, PRS configuration information) associated with the set of positioning signals 516 or the set of positioning signals 512 at the wireless device 502, assistance information associated with the set of positioning signals 518 or the set of positioning signals 514 at the wireless device 502, assistance information associated with the set of positioning signals 516, the set of positioning signals 512, the set of positioning signals 518, or the set of positioning signals 514 at the network entity 508, and/or the location of the wireless device 504. After the positioning model is trained, the wireless device 502 may transmit the set of positioning signals 516 at the wireless device 504 and the wireless device 506 may transmit the set of positioning signals 518 at the wireless device 504. The wireless device 504 may measure the set of positioning signals 516 and the set of positioning signals 518. The wireless device 504 may receive assistance information from the wireless device 502, the wireless device 504, and/or the network entity 508. The wireless device 504 may use the positioning model to calculate a set of intermediate measurements that the wireless device 504 may use to calculate its location, and may transmit its location to the network entity 508. In another aspect, the wireless device 504 may transmit the set of intermediate measurements to the network entity 508, and the network entity 508 may calculate the position of the wireless device 504. The network entity 508 may not transmit as much assistance information to the wireless device 504 as when the wireless device 504 calculates its own location using the intermediate measurements from the positioning model, minimizing the amount of assistance information transmitted to the wireless device 504 for its positioning model. In some aspects, the wireless device 504 may be used to generate a positioning model that may be used by another UE or PRU in an area about where the wireless device 504 was trained.

In another aspect, a system may be configured to train a positioning model at the network entity 508. For example, the network entity 508 may have a positioning model configured to calculate a location of the wireless device 504 based on a set of inputs. The network entity 508 may train the positioning model based on a calculated location of the wireless device 504 and a set of inputs, such as measurements of the set of positioning signals 516 received at the wireless device 504, measurements of the set of positioning signals 518 received at the wireless device 504, measurements of the set of positioning signals 512 received at the wireless device 502, measurements of the set of positioning signals 514 received at the wireless device 506, intermediate measurements calculated at the wireless device 504, intermediate measurements calculated at the wireless device 502, intermediate measurements calculated at the wireless device 506, intermediate measurements calculated at the network entity 508, assistance information associated with the set of positioning signals 516 or the set of positioning signals 512 at the wireless device 502, assistance information associated with the set of positioning signals 518 or the set of positioning signals 514 at the wireless device 502, and/or assistance information associated with the set of positioning signals 516, the set of positioning signals 512, the set of positioning signals 518, or the set of positioning signals 514 at the network entity 508. The location of the wireless device 504 may be calculated at the network entity 508, the wireless device 502, the wireless device 506, or the wireless device 504. After the positioning model is trained, the wireless device 502 may transmit the set of positioning signals 516 at the wireless device 504 and the wireless device 506 may transmit the set of positioning signals 518 at the wireless device 504. The wireless device 504 may measure the set of positioning signals 516 and the set of positioning signals 518. The wireless device 504 may transmit its measurements to the network entity 508. The network entity may then calculate a location of the wireless device 504 based on the received measurements and any assistance information and/or measurements received by other devices, such as the measurements of the set of positioning signals 512 from the wireless device 504 measured by the wireless device 502 or the set of positioning signals 514 from the wireless device 504 measured by the wireless device 506. The network entity 508 may use the positioning model to calculate the location of the wireless device 504. In some aspects, the wireless device 504 may be used to generate a positioning model that may be used by the network entity 508 to calculate a location of another UE or PRU in an area about where the wireless device 504 was trained.

In some aspects, the wireless device 504 may initiate the training collection. For example, the wireless device 504 may transmit a request to the network entity 508 to provide its capability to be involved in a training data collection session and to provide labeling assistance and/or other network-side related assistance information (e.g., TRP beam configurations, location information, mapping for PRS resources to TRP locations and/or resource beams). The request message may include an indication for a request for the type of labeling assistance that the network entity 508 may provide (e.g., provide labels for a location of the wireless device 504, provide labels for intermediate measurements that may be used to calculate the location of the wireless device 504). In response to the request message, the network entity 508 may transmit an indication of its capability to assist the wireless device 504 in collecting training data and in providing labeling assistance (e.g., the network entity 508 may leverage the estimated/calculated/known location of the wireless device 504 to calculate/derive intermediate labels based on its knowledge of TRP locations) or other assistance information (e.g., TRP beam configurations). In response to receiving the indication of the capability of the network entity 508, the wireless device 504 may a set of attributes of a requested DL positioning signal configuration to the network entity 508. The set of attributes of the requested DL positioning signal configuration may include a periodicity of the label assistance reporting and/or whether the network entity 508 should report enhanced timing or resource indications used as labeling assistance information. The network entity 508 may transmit labels and/or assistance information to the wireless device 504 for training a positioning model. The network entity 508 may transmit such data periodically in accordance to the request from the wireless device 504. The network entity 508 may transmit any suitable assistance information that may be used to train the positioning model, such as TRP beam information or enhanced timing and indication of resources used to generate labels. In some aspects, the wireless device 504 may transmit measurements and/or its location (e.g., obtained using non-RAT methods) to the network entity 508 for the network entity 508 to use to calculate intermediate measurement labels, which may be transmitted to the wireless device 504 for training a positioning model.

In some aspects, the network entity 508 may initiate the training collection. For example, the network entity 508 may transmit a request to the wireless device 504 to provide its capability to be involved in a training data collection session and to provide labeling assistance and/or other device-side related assistance information (e.g., CIR, CFR, PDP. ToA, RSTD, RSRP, RSRPP, AoD). The request message may include an indication for a request for the type of training data that the wireless device 504 may provide (e.g., CIR, CFR, PDP, ToA, RSTD, RSRP, RSRPP, AoD). In response to the request message, the wireless device 504 may transmit an indication of its capability to assist the network entity 508 in collecting training data and/or in providing labeling assistance (e.g., using non-RAT methods or RAT methods to calculate a location of the wireless device 504). In response to receiving the indication of the capability of the wireless device 504, the network entity 508 may transmit assistance data to the wireless device 504 to assist in data collection (e.g., as part of LPPa assistance data exchange). The assistance data may include PRS configuration information, types of measurements for the wireless device 504 to report, periodicity for the wireless device 504 to report measurements and/or assistance data, and/or whether the wireless device 504 should report enhanced timing or resource indications. The wireless device 504 may receive positioning signals, such as the set of positioning signals 516 and the set of positioning signals 518, collect measurements of the positioning signals, and feed back any measurements, report, labels, and/or assistance data to the network entity 508 for training a positioning model.

Figure 6:
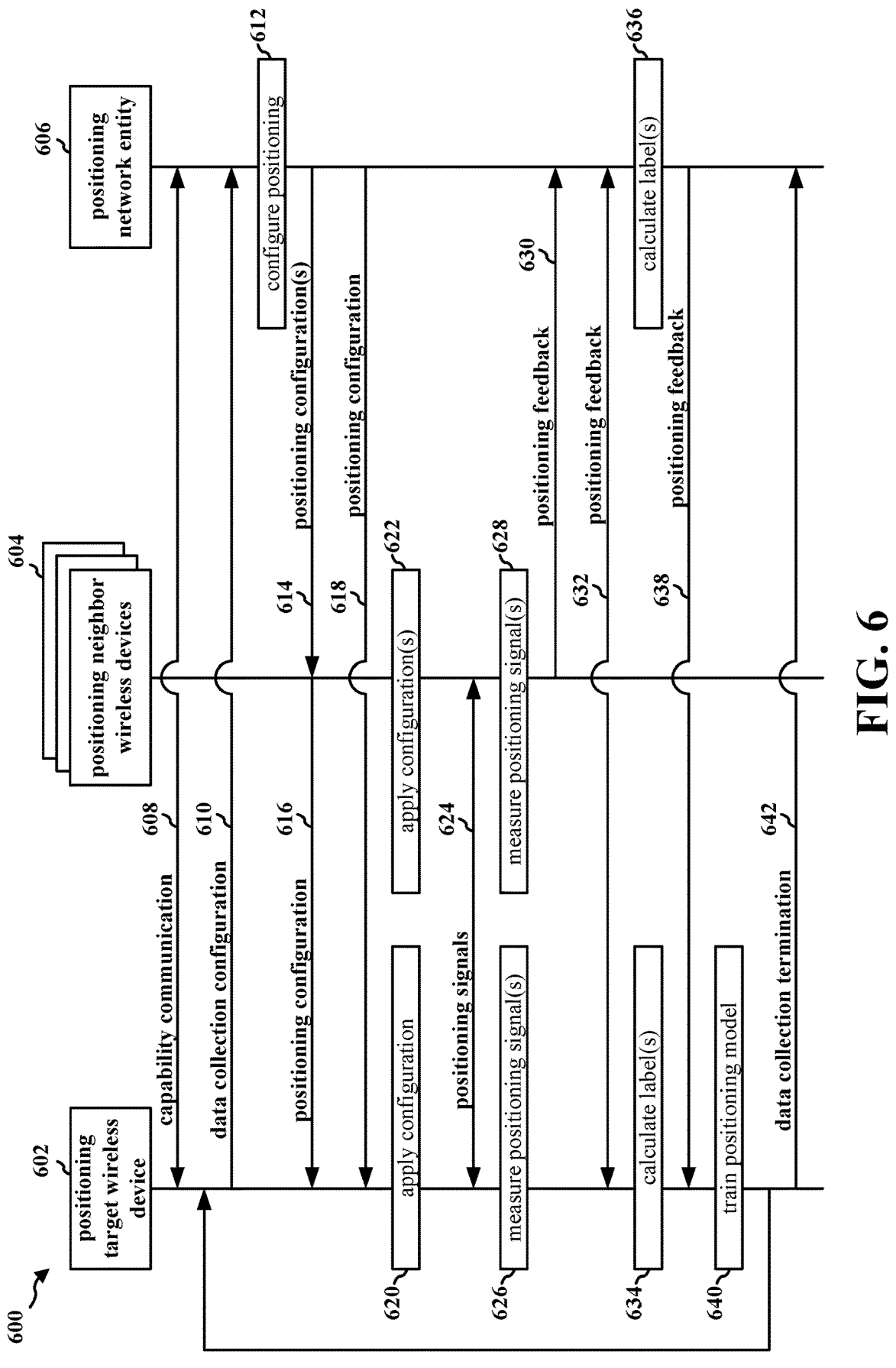
FIG. 6 is a connection flow diagram illustrating an example of communications between a positioning target wireless device, a set of positioning neighbor wireless devices, and a positioning network entity configured to train a positioning model.

FIG. 6 is a connection flow diagram 600 illustrating an example of communications between a positioning target wireless device 602, a set of positioning neighbor wireless devices 604, and a positioning network entity 606 configured to train a positioning model at the positioning target wireless device 602. The positioning model may be configured to calculate a position of the positioning target wireless device 602 and/or a set of measurements that may be used to calculate the position of the positioning target wireless device 602. The positioning target wireless device 602 may be a UE or a PRU. The PRU may have a set of sensors that may be used to calculate the location of the PRU with a high degree of accuracy, such as a LIDAR sensor, a GNSS device, or a WLAN system configured to calculate a location of the positioning target wireless device 602 based on received WLAN signals. The PRU may be a fixed PRU with a known location, or may be a mobile PRU that is placed in a known location for the duration of collecting measurements for training the positioning model. The set of positioning neighbor wireless devices 604 may include a set of base stations and/or a set of TRPs configured to transmit positioning signals at the positioning target wireless device 602. The positioning network entity 606 may include an LMF, or may include one or more location servers. The positioning network entity 606 may be configured to configure positioning between the positioning target wireless device 602 and the set of positioning neighbor wireless devices 604.

The positioning target wireless device 602 may transmit capability communication 608 to the positioning network entity 606. The positioning network entity 606 may receive capability communication 608 from the positioning target wireless device 602. The positioning network entity 606 may transmit capability communication 608 to the positioning target wireless device 602. The positioning target wireless device 602 may receive the capability communication 608 from the positioning network entity 606. The capability communication 608 may include capability of the positioning target wireless device 602 and/or the positioning network entity 606 to provide training data for a training a positioning model. For example, the positioning target wireless device 602 may transmit a request to the positioning network entity 606 to provide its capability to be involved in a training data collection session and provide labeling assistance and/or other network-side related assistance information (e.g., TRP beam configurations, location information of one or more of the set of positioning neighbor wireless devices 604, mapping for positioning signal resources to one or more of the set of positioning neighbor wireless devices 604, mapping for positioning signals resources to one or more of the beams for the positioning signals). The request message may also inquire the type of labeling assistance that the positioning network entity 606 may provide. The positioning network entity 606 may, in response, transmit its capability and/or any type of labeling assistance that it may provide to the positioning target wireless device 602. For example, the positioning network entity 606 may indicate its capability to assist the positioning target wireless device 602 in collecting training data and provide labeling assistance. In some aspects, the positioning network entity 606 may leverage a location label (e.g., a UE estimated location or a PRU known location) to calculate intermediate measurement labels based on its knowledge of locations of the set of positioning neighbor wireless devices 604. This way, the positioning network entity 606 may provide a set of intermediate measurement labels to the positioning target wireless device 602 without providing a location of one or more of the set of positioning neighbor wireless devices 604. In some aspects, the positioning network entity 606 may collect other assistance information, such as beam configurations of positioning signals transmitted to the positioning target wireless device 602.

The positioning target wireless device 602 may transmit a data collection configuration 610 to the positioning network entity 606. The positioning network entity 606 may receive the data collection configuration 610 from the positioning target wireless device 602. The data collection configuration 610 may include one or more attributes of a desired downlink reference signal configuration for the positioning target wireless device 602. In one aspect, the data collection configuration 610 may include a configuration for a set of PRSs transmitted to the positioning target wireless device 602 (e.g., by the set of positioning neighbor wireless devices 604). In one aspect, the data collection configuration 610 may include a requested periodicity for the positioning network entity 606 to provide label assistance reporting to the positioning target wireless device 602. In one aspect, the data collection configuration 610 may include whether the positioning network entity 606 should report any enhanced timing or resource indication used in labeling assistance.

At 612, the positioning network entity 606 may configure positioning for the positioning target wireless device 602 and the set of positioning neighbor wireless devices 604. The positioning network entity 606 may transmit a set of positioning configurations 614 at the set of positioning neighbor wireless devices 604. The set of positioning neighbor wireless devices 604 may receive the set of positioning configurations 614. The positioning network entity 606 may transmit the positioning configuration 618 at the positioning target wireless device 602. The positioning target wireless device 602 may receive the positioning configuration 618 from the positioning network entity 606. In some aspects, a base station serving the positioning target wireless device 602 may transmit the positioning configuration 616 at the positioning target wireless device 602. The positioning configuration 616 may be based on one or more of the set of positioning configurations 614 received by the set of positioning neighbor wireless devices 604. The positioning target wireless device 602 may receive the positioning configuration 616 from the serving base station.

At 620, the positioning target wireless device 602 may apply the received positioning configuration. At 622, the set of positioning neighbor wireless devices 604 may apply the set of received positioning configurations. The positioning configurations may configure the set of positioning signals 624. The set of positioning signals 624 may include one or more sets of SRSs transmitted from the positioning target wireless device 602 and received at the set of positioning neighbor wireless devices 604. At 628, the set of positioning neighbor wireless devices 604 may measure the set of positioning signals 624. The set of positioning signals 624 may include one or more sets of PRSs transmitted from the set of positioning neighbor wireless devices 604 and received at the positioning target wireless device 602. At 626, the positioning target wireless device 602 may measure the set of positioning signals 624.

The positioning target wireless device 602 may take any suitable measurement of the set of positioning signals 624. The set of positioning neighbor wireless devices 604 may take any suitable measurement of the set of positioning signals 624. For example, a wireless device may measure a reference signal time difference (RSTD) measurement between a first signal of the set of positioning signals 624 and a second signal of the set of positioning signals 624. A wireless device may measure a range of a set of RSTD measurements of a subset of the set of positioning signals 624. A wireless device may measure a distribution of the range (e.g., which portion of the range is more concentrated than another portion). A wireless device may measure a reference signal received power (RSRP) measurement of at least one of the set of positioning signals 624. The RSRP may be a measurement for all path contributions. A wireless device may measure a range of a set of RSRP measurements of a subset of the set of positioning signals 624. A wireless device may measure a distribution of the range. A wireless device may measure a reference signal received power path (RSRPP) measurement of at least one of the set of positioning signals 624. The RSRPP may indicate the power contribution on a per path level. A wireless device may measure a range of a set of RSRPP measurements of a subset of the set of positioning signals 624. A wireless device may measure a distribution of the range. A wireless device may measure an AoD of at least one of the set of positioning signals 624. A wireless device may measure a range of a set of AoD measurements of a subset of the set of positioning signals 624. A wireless device may measure a distribution of the range. A wireless device may measure a line-of-sight (LOS) path based on at least one of the set of positioning signals 624. The LOS path may be between the positioning target wireless device 602 and one of the set of positioning neighbor wireless devices 604. A wireless device may measure a phase of the LOS path. A wireless device may measure a reflection path based on at least one of the set of positioning signals 624. A wireless device may measure a channel impulse response (CIR) measurement based on at least one of the set of positioning signals 624. A wireless device may measure a channel frequency response (CFR) measurement based on at least one of the set of positioning signals 624. A wireless device may measure a power delay profile (PDP) measurement based on at least one of the set of positioning signals 624.

The set of positioning neighbor wireless devices 604 may transmit positioning feedback 630 at the positioning network entity 606. The positioning network entity 606 may receive the positioning feedback 630 from the set of positioning neighbor wireless devices 604. The positioning feedback 630 may include measurements taken at 628. The positioning feedback 630 may include assistance information associated with the set of positioning signals 624 received by the set of positioning neighbor wireless devices 604. The positioning feedback 630 may include assistance information associated with the set of positioning signals 624 transmitted by the set of positioning neighbor wireless devices 604. The assistance information may include a bandwidth part (BWP) associated with the set of positioning signals 624. The assistance information may include a number of transmission reception points (TRPs) associated with the set of positioning signals 624. The assistance information may include a location associated with at least one TRP associated with the set of positioning signals 624. The assistance information may include a positioning configuration associated with the set of positioning signals 624. The positioning configuration may include a PRS configuration for a set of PRSs or an SRS configuration for a set of SRSs. The positioning configuration may include beam information. The assistance information may include a frame number associated with the set of positioning signals 624. The assistance information may include a slot index associated with the set of positioning signals 624. The assistance information may include an orthogonal frequency-division multiplexing (OFDM) symbol associated with the set of positioning signals 624. The assistance information may include a hyper frame number associated with the set of positioning signals 624. The assistance information may include a coordinated universal time (UTC) associated with the set of positioning signals 624. The assistance information may include an indication of an implementation error. An implementation error may include, for example, synchronization errors at the positioning target wireless device 602, synchronization errors at one of the set of positioning neighbor wireless devices 604, timing errors at one of the set of positioning neighbor wireless devices 604, or timing errors at the positioning target wireless device 602. The assistance information may include a resource mapping associated with the set of positioning signals 624. The resource mapping may be between a resource (e.g., an SRS resource, a PRS resource), a location of one of the set of positioning neighbor wireless devices 604, a beam angle, and/or one of the set of positioning signals 624. In one example, the mapping may be between TRP IDs and PRS resources (e.g., [TRP_ID1, PRS_c; TRP_ID2, PRS_a; TRP_ID3, PRS_b]). In another example, the mapping may be between beam IDs and PRS resources (e.g., [TRP_ID1_Beam1, PRS_c; TRP_ID1_Beam2, PRS_d; TRP_ID2_Beam1, PRS_a; TRP_ID2_Beam2, PRS_c; TRP_ID3_Beam1, PRS_b; TRP_ID3_Beam2, PRS_f]). In another example, the mapping may between TRP IDs, beam IDs, and PRS resources (e.g., [TRP_ID1, Beam1, PRS_c; TRP_ID1, Beam2, PRS_d; TRP_ID2, Beam1, PRS_a; TRP_ID2, Beam2, PRS_c; TRP_ID3, Beam1, PRS_b; TRP_ID3, Beam2, PRS_f]). The assistance information may include a second indication of a first quality of a label. The assistance information may include a third indication of a quality of a measurement of the set of positioning signals 624.

The positioning network entity 606 may transmit the positioning feedback 632 at the positioning target wireless device 602. The positioning target wireless device 602 may receive the positioning feedback 632 from the positioning target wireless device 602. The positioning target wireless device 602 may transmit the positioning feedback 632 at the positioning network entity 606. The positioning network entity 606 may receive the positioning feedback 632 from the positioning target wireless device 602. The positioning feedback 632 may include measurements or assistance information received from the set of positioning neighbor wireless devices 604. The positioning feedback 632 may include assistance information, such as the assistance information from one of the set of positioning neighbor wireless devices 604, or assistance information configured by the positioning network entity 606 at 612. The positioning feedback 632 may include measurements taken at 626.

At 634, the positioning target wireless device 602 may calculate one or more labels, such as a position of the positioning target wireless device 602, or an intermediate label using one or more of the measurements taken at 626 and/or data received as the positioning feedback 632. In some aspects, at 636 the positioning network entity 606 may calculate one or more labels, such as a position of the positioning target wireless device 602, or an intermediate label using one or more of the measurements taken at 626, one or more of the measurements taken at 628 and/or data received as the positioning feedback 632 and/or positioning feedback 630. The positioning network entity 606 may transmit one or more of the calculated labels as the positioning feedback 638 to the positioning target wireless device 602.

At 640, the positioning target wireless device 602 may train the positioning model. In some aspects, the positioning target wireless device 602 may determine that the data collection configuration should be updated, for example if the input data or a label is too noisy. The positioning target wireless device 602 may then transmit an update as the data collection configuration 610 to the positioning network entity 606, continuing to massage the process of data collection training until the positioning model is well-trained.

When the positioning target wireless device 602 is finished training the positioning model, the positioning target wireless device 602 may transmit a data collection termination 642 to the positioning network entity 606. The positioning network entity 606 may receive the data collection termination 642 from the positioning target wireless device 602. The positioning network entity 606 may then terminate the positioning.

Figure 7:
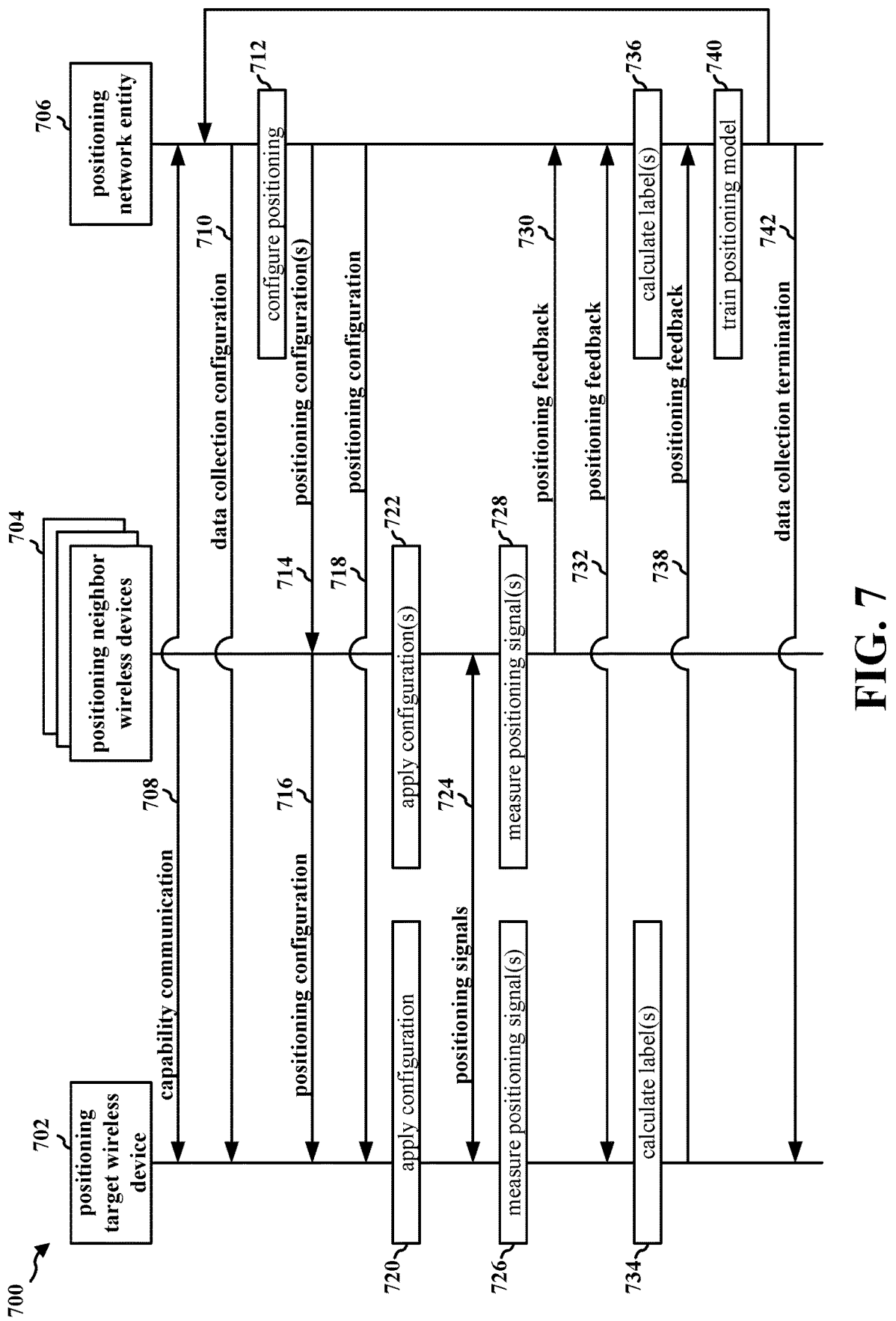
FIG. 7 is a connection flow diagram illustrating an example of communications between a positioning target wireless device, a set of positioning neighbor wireless devices, and a positioning network entity configured to train a positioning model.

FIG. 7 is a connection flow diagram 700 illustrating an example of communications between a positioning target wireless device 702, a set of positioning neighbor wireless devices 704, and a positioning network entity 706 configured to train a positioning model at the positioning target wireless device 702. The positioning model may be configured to calculate a position of the positioning target wireless device 702 and/or a set of measurements that may be used to calculate the position of the positioning target wireless device 702. The positioning target wireless device 702 may be a UE or a PRU. The PRU may have a set of sensors that may be used to calculate the location of the PRU with a high degree of accuracy, such as a LIDAR sensor, a GNSS device, or a WLAN system configured to calculate a location of the positioning target wireless device 702 based on received WLAN signals. The PRU may be a fixed PRU with a known location, or may be a mobile PRU that is placed in a known location for the duration of collecting measurements for training the positioning model. The set of positioning neighbor wireless devices 704 may include a set of base stations and/or a set of TRPs configured to transmit positioning signals at the positioning target wireless device 702. The positioning network entity 706 may include an LMF, or may include one or more location servers. The positioning network entity 706 may be configured to configure positioning between the positioning target wireless device 702 and the set of positioning neighbor wireless devices 704.

The positioning target wireless device 702 may transmit capability communication 708 to the positioning network entity 706. The positioning network entity 706 may receive capability communication 708 from the positioning target wireless device 702. The positioning network entity 706 may transmit capability communication 708 to the positioning target wireless device 702. The positioning target wireless device 702 may receive the capability communication 708 from the positioning network entity 706. The capability communication 708 may include capability of the positioning target wireless device 702 and/or the positioning network entity 706 to provide training data for a training a positioning model. For example, the positioning target wireless device 702 may transmit a request to the positioning network entity 706 to provide its capability to be involved in a training data collection session and provide labeling assistance and/or other network-side related assistance information (e.g., TRP beam configurations, location information of one or more of the set of positioning neighbor wireless devices 704, mapping for positioning signal resources to one or more of the set of positioning neighbor wireless devices 704, mapping for positioning signals resources to one or more of the beams for the positioning signals). The request message may also inquire the type of labeling assistance that the positioning network entity 706 may provide. The positioning network entity 706 may, in response, transmit its capability and/or any type of labeling assistance that it may provide to the positioning target wireless device 702. For example, the positioning network entity 706 may indicate its capability to assist the positioning target wireless device 702 in collecting training data and provide labeling assistance. In some aspects, the positioning network entity 706 may leverage a location label (e.g., a UE estimated location or a PRU known location) to calculate intermediate measurement labels based on its knowledge of locations of the set of positioning neighbor wireless devices 704. This way, the positioning network entity 706 may provide a set of intermediate measurement labels to the positioning target wireless device 702 without providing a location of one or more of the set of positioning neighbor wireless devices 704. In some aspects, the positioning network entity 706 may collect other assistance information, such as beam configurations of positioning signals transmitted to the positioning target wireless device 702.

The positioning network entity 706 may transmit a data collection configuration 710 to the positioning target wireless device 702. The positioning target wireless device 702 may receive the data collection configuration 710 from the positioning network entity 706. The data collection configuration 710 may include one or more attributes of a desired downlink reference signal configuration for the positioning target wireless device 702. In one aspect, the data collection configuration 710 may include a configuration for a set of PRSs transmitted to the positioning target wireless device 702 (e.g., by the set of positioning neighbor wireless devices 704). In one aspect, the data collection configuration 710 may include a requested periodicity for the positioning network entity 706 to provide label assistance reporting to the positioning target wireless device 702. In one aspect, the data collection configuration 710 may include whether the positioning target wireless device 702 should report any enhanced timing or resource indication used in labeling assistance.

At 712, the positioning network entity 706 may configure positioning for the positioning target wireless device 702 and the set of positioning neighbor wireless devices 704. The positioning network entity 706 may transmit a set of positioning configurations 714 at the set of positioning neighbor wireless devices 704. The set of positioning neighbor wireless devices 704 may receive the set of positioning configurations 714. The positioning network entity 706 may transmit the positioning configuration 718 at the positioning target wireless device 702. The positioning target wireless device 702 may receive the positioning configuration 718 from the positioning network entity 706. In some aspects, a base station serving the positioning target wireless device 702 may transmit the positioning configuration 716 at the positioning target wireless device 702. The positioning configuration 716 may be based on one or more of the set of positioning configurations 714 received by the set of positioning neighbor wireless devices 704. The positioning target wireless device 702 may receive the positioning configuration 716 from the serving base station.

At 720, the positioning target wireless device 702 may apply the received positioning configuration. At 722, the set of positioning neighbor wireless devices 704 may apply the set of received positioning configurations. The positioning configurations may configure the set of positioning signals 724. The set of positioning signals 724 may include one or more sets of SRSs transmitted from the positioning target wireless device 702 and received at the set of positioning neighbor wireless devices 704. At 728, the set of positioning neighbor wireless devices 704 may measure the set of positioning signals 724. The set of positioning signals 724 may include one or more sets of PRSs transmitted from the set of positioning neighbor wireless devices 704 and received at the positioning target wireless device 702. At 726, the positioning target wireless device 702 may measure the set of positioning signals 724.

The positioning target wireless device 702 may take any suitable measurement of the set of positioning signals 724. The set of positioning neighbor wireless devices 704 may take any suitable measurement of the set of positioning signals 724. For example, a wireless device may measure a reference signal time difference (RSTD) measurement between a first signal of the set of positioning signals 724 and a second signal of the set of positioning signals 724. A wireless device may measure a range of a set of RSTD measurements of a subset of the set of positioning signals 724. A wireless device may measure a distribution of the range (e.g., which portion of the range is more concentrated than another portion). A wireless device may measure a reference signal received power (RSRP) measurement of at least one of the set of positioning signals 724. The RSRP may be a measurement for all path contributions. A wireless device may measure a range of a set of RSRP measurements of a subset of the set of positioning signals 724. A wireless device may measure a distribution of the range. A wireless device may measure a reference signal received power path (RSRPP) measurement of at least one of the set of positioning signals 724. The RSRPP may indicate the power contribution on a per path level. A wireless device may measure a range of a set of RSRPP measurements of a subset of the set of positioning signals 724. A wireless device may measure a distribution of the range. A wireless device may measure an AoD of at least one of the set of positioning signals 724. A wireless device may measure a range of a set of AoD measurements of a subset of the set of positioning signals 724. A wireless device may measure a distribution of the range. A wireless device may measure a line-of-sight (LOS) path based on at least one of the set of positioning signals 724. The LOS path may be between the positioning target wireless device 702 and one of the set of positioning neighbor wireless devices 704. A wireless device may measure a phase of the LOS path. A wireless device may measure a reflection path based on at least one of the set of positioning signals 724. A wireless device may measure a channel impulse response (CIR) measurement based on at least one of the set of positioning signals 724. A wireless device may measure a channel frequency response (CFR) measurement based on at least one of the set of positioning signals 724. A wireless device may measure a power delay profile (PDP) measurement based on at least one of the set of positioning signals 724.

The set of positioning neighbor wireless devices 704 may transmit positioning feedback 730 at the positioning network entity 706. The positioning network entity 706 may receive the positioning feedback 730 from the set of positioning neighbor wireless devices 704. The positioning feedback 730 may include measurements taken at 728. The positioning feedback 730 may include assistance information associated with the set of positioning signals 724 received by the set of positioning neighbor wireless devices 704. The positioning feedback 730 may include assistance information associated with the set of positioning signals 724 transmitted by the set of positioning neighbor wireless devices 704. The assistance information may include a bandwidth part (BWP) associated with the set of positioning signals 724. The assistance information may include a number of transmission reception points (TRPs) associated with the set of positioning signals 724. The assistance information may include a location associated with at least one TRP associated with the set of positioning signals 724. The assistance information may include a positioning configuration associated with the set of positioning signals 724. The positioning configuration may include a PRS configuration for a set of PRSs or an SRS configuration for a set of SRSs. The positioning configuration may include beam information. The assistance information may include a frame number associated with the set of positioning signals 724. The assistance information may include a slot index associated with the set of positioning signals 724. The assistance information may include an orthogonal frequency-division multiplexing (OFDM) symbol associated with the set of positioning signals 724. The assistance information may include a hyper frame number associated with the set of positioning signals 724. The assistance information may include a coordinated universal time (UTC) associated with the set of positioning signals 724. The assistance information may include an indication of an implementation error. An implementation error may include, for example, synchronization errors at the positioning target wireless device 702, synchronization errors at one of the set of positioning neighbor wireless devices 704, timing errors at one of the set of positioning neighbor wireless devices 704, or timing errors at the positioning target wireless device 702. The assistance information may include a resource mapping associated with the set of positioning signals 724. The resource mapping may be between a resource (e.g., an SRS resource, a PRS resource), a location of one of the set of positioning neighbor wireless devices 704, a beam angle, and/or one of the set of positioning signals 724. The assistance information may include a second indication of a first quality of a label. The assistance information may include a third indication of a quality of a measurement of the set of positioning signals 724.

The positioning network entity 706 may transmit the positioning feedback 732 at the positioning target wireless device 702. The positioning target wireless device 702 may receive the positioning feedback 732 from the positioning target wireless device 702. The positioning target wireless device 702 may transmit the positioning feedback 732 at the positioning network entity 706. The positioning network entity 706 may receive the positioning feedback 732 from the positioning target wireless device 702. The positioning feedback 732 may include measurements or assistance information received from the set of positioning neighbor wireless devices 704. The positioning feedback 732 may include assistance information, such as the assistance information from one of the set of positioning neighbor wireless devices 704, or assistance information configured by the positioning network entity 706 at 712. The positioning feedback 732 may include measurements taken at 726.

At 734, the positioning target wireless device 702 may calculate one or more labels, such as a position of the positioning target wireless device 702, or an intermediate label using one or more of the measurements taken at 726 and/or data received as the positioning feedback 732. In some aspects, at 736 the positioning network entity 706 may calculate one or more labels, such as a position of the positioning target wireless device 702, or an intermediate label using one or more of the measurements taken at 726, one or more of the measurements taken at 728 and/or data received as the positioning feedback 732 and/or positioning feedback 730. The positioning network entity 706 may transmit one or more of the calculated labels as the positioning feedback 738 to the positioning target wireless device 702.

At 740, the positioning network entity 706 may train the positioning model. In some aspects, the positioning network entity 706 may determine that the data collection configuration should be updated, for example if the input data or a label is too noisy. The positioning network entity 706 may then transmit an update as the data collection configuration 710 to the positioning target wireless device 702, continuing to massage the process of data collection training until the positioning model is well-trained.

When the positioning network entity 706 is finished training the positioning model, the positioning network entity 706 may transmit a data collection termination 742 to the positioning target wireless device 702. The positioning target wireless device 702 may receive the data collection termination 742 from the positioning network entity 706. The positioning network entity 706 may then terminate collecting positioning data for transmission to the positioning network entity 706.

FIG. 8 is a flowchart 800 of a method of wireless communication. The method may be performed by a wireless device (e.g., the UE 104, the UE 350; the wireless device 404, the wireless device 504; the positioning target wireless device 602; the positioning target wireless device 702; the apparatus 1404). At 802, the wireless device may receive a set of PRSs. For example, 802 may be performed by the positioning target wireless device 602 in FIG. 6, which may receive the set of positioning signals 624 transmitted from the set of positioning neighbor wireless devices 604 to the positioning target wireless device 602. The set of positioning signals 624 may include a set of PRSs. Moreover, 802 may be performed by the component 198 in FIG. 1, 3, or 14.

At 804, the wireless device may measure the set of PRSs. For example, 804 may be performed by the positioning target wireless device 602 in FIG. 6, which may, at 626, measure the set of positioning signals 624. Moreover, 804 may be performed by the component 198 in FIG. 1, 3, or 14.

At 806, the wireless device may output at least one of a set of measurements based on the measured set of PRSs, a set of labels associated with the measured set of PRSs, or assistance information associated with the measured set of PRSs for training a positioning model. For example, 806 may be performed by the positioning target wireless device 602 in FIG. 6, which may, at 640, train a positioning model based on the set of measurements taken at 626 of the set of positioning signals 624. The positioning target wireless device 602 may, at 640, train a positioning model based on a set of labels calculated at the positioning target wireless device 602 at 634 or received from the positioning network entity 606 as the positioning feedback 638. The positioning target wireless device 602 may, at 640, train a positioning model based on assistance information received from the positioning network entity 606 as the positioning feedback 632 or the positioning feedback 638. In another example, 806 may be performed by the positioning target wireless device 702 in FIG. 7, which may transmit the set of measurements taken at 726 of the set of positioning signals 724 as the positioning feedback 738 to the positioning network entity 706. The positioning target wireless device 702 in FIG. 7 may transmit a set of labels calculated at the positioning target wireless device 702 at 734 as the positioning feedback 738 to the positioning network entity 706. The positioning target wireless device 702 in FIG. 7 may transmit assistance information associated with measuring the set of positioning signals 724 at 726 as the positioning feedback 738 to the positioning network entity 706. The positioning network entity 706 may use the positioning feedback 738 to train the positioning model at 740. Moreover, 806 may be performed by the component 198 in FIG. 1, 3, or 14.

FIG. 9 is a flowchart 900 of a method of wireless communication. The method may be performed by a wireless device (e.g., the UE 104, the UE 350; the wireless device 404, the wireless device 504; the positioning target wireless device 602; the positioning target wireless device 702; the apparatus 1404). At 902, the wireless device may receive a set of PRSs. For example, 902 may be performed by the positioning target wireless device 602 in FIG. 6, which may receive the set of positioning signals 624 transmitted from the set of positioning neighbor wireless devices
604 to the positioning target wireless device 602. The set of
positioning signals 624 may include a set of PRSs. More-
over, 902 may be performed by the component 198 in FIG.
1, 3, or 14.

At 904, the wireless device may measure the set of PRSs.
For example, 904 may be performed by the positioning
target wireless device 602 in FIG. 6, which may, at 626,
measure the set of positioning signals 624. Moreover, 904
may be performed by the component 198 in FIG. 1, 3, or 14.

At 906, the wireless device may output at least one of a
set of measurements based on the measured set of PRSs, a
set of labels associated with the measured set of PRSs, or
assistance information associated with the measured set of
PRSs for training a positioning model. For example, 906
may be performed by the positioning target wireless device
602 in FIG. 6, which may, at 640, train a positioning model
based on the set of measurements taken at 626 of the set of
positioning signals 624. The positioning target wireless
device 602 may, at 640, train a positioning model based on
a set of labels calculated at the positioning target wireless
device 602 at 634 or received from the positioning network
entity 606 as the positioning feedback 638. The positioning
target wireless device 602 may, at 640, train a positioning
model based on assistance information received from the
positioning network entity 606 as the positioning feedback
632 or the positioning feedback 638. In another example,
906 may be performed by the positioning target wireless
device 702 in FIG. 7, which may transmit the set of
measurements taken at 726 of the set of positioning signals
724 as the positioning feedback 738 to the positioning
network entity 706. The positioning target wireless device
702 in FIG. 7 may transmit a set of labels calculated at the
positioning target wireless device 702 at 734 as the posi-
tioning feedback 738 to the positioning network entity 706.
The positioning target wireless device 702 in FIG. 7 may
transmit assistance information associated with measuring
the set of positioning signals 724 at 726 as the positioning
feedback 738 to the positioning network entity 706. The
positioning network entity 706 may use the positioning
feedback 738 to train the positioning model at 740. More-
over, 906 may be performed by the component 198 in FIG.
1, 3, or 14.

At 908, the wireless device may receive a set of signals
via at least one of a LIDAR device, a GNSS device, or a
WLAN antenna. For example, 908 may be performed by the
positioning target wireless device 602 in FIG. 6, which may
receive a set of signals via at least one of a LIDAR device,
a GNSS device, or a WLAN antenna to calculate the
position/location of the positioning target wireless device
602 with a high degree of accuracy (e.g., by determining the
location of the positioning target wireless device 602 via
recognizing objects via a LIDAR device, by performing a
GNSS fix using a GNSS device, or by calculating RTT or
TDOA via reflected/returned WLAN signals). Moreover,
908 may be performed by the component 198 in FIG. 1, 3,
or 14.

At 910, the wireless device may calculate the position of
the wireless device based on the set of signals, where the set
of labels may include an indication of a position of the
wireless device. For example, 910 may be performed by the
positioning target wireless device 602 in FIG. 6, which may,
at 634, calculate the position of the positioning target
wireless device 602 based on the set of signals. The set of
labels may include an indication of a position/location of the
positioning target wireless device 602. Moreover, 910 may
be performed by the component 198 in FIG. 1, 3, or 14.

At 912, the wireless device may receive at least a subset
of the set of labels, where the subset of the set of labels may
include a second set of measurements based on the set of
PRSs. For example, 912 may be performed by the position-
ing target wireless device 602 in FIG. 6, which may receive
at least a subset of the set of labels used to train the
positioning model at 640 as the positioning feedback 632
and/or the positioning feedback 638. The subset of the set of
labels used to train the positioning model at 640 may include
a second set of measurements based on the set of positioning
signals 624. Moreover, 912 may be performed by the
component 198 in FIG. 1, 3, or 14.

At 914, the wireless device may transmit a request for at
least the first subset of the set of labels or the second subset
of the assistance information. For example, 914 may be
performed by the positioning target wireless device 602 in
FIG. 6, which may transmit a request as the data collection
configuration 610 for at least the first subset of the set of
labels or the second subset of the assistance information to
be transmitted to the positioning target wireless device 602
as the positioning feedback 632 and/or the positioning
feedback 638. Moreover, 914 may be performed by the
component 198 in FIG. 1, 3, or 14.

At 916, the wireless device may receive at least a first
subset of the set of labels or a second subset of the assistance
information, where receiving at least the first subset of the
set of labels or the subset of the assistance information may
be in response to the request. For example, 916 may be
performed by the positioning target wireless device 602 in
FIG. 6, which may receive at least a first subset of the set of
labels or a second subset of the assistance information as the
positioning feedback 632 and/or the positioning feedback
638. Receiving at least the first subset of the set of labels or
the subset of the assistance information may be in response
to the request in the data collection configuration 610.
Moreover, 916 may be performed by the component 198 in
FIG. 1, 3, or 14.

Figure 10:
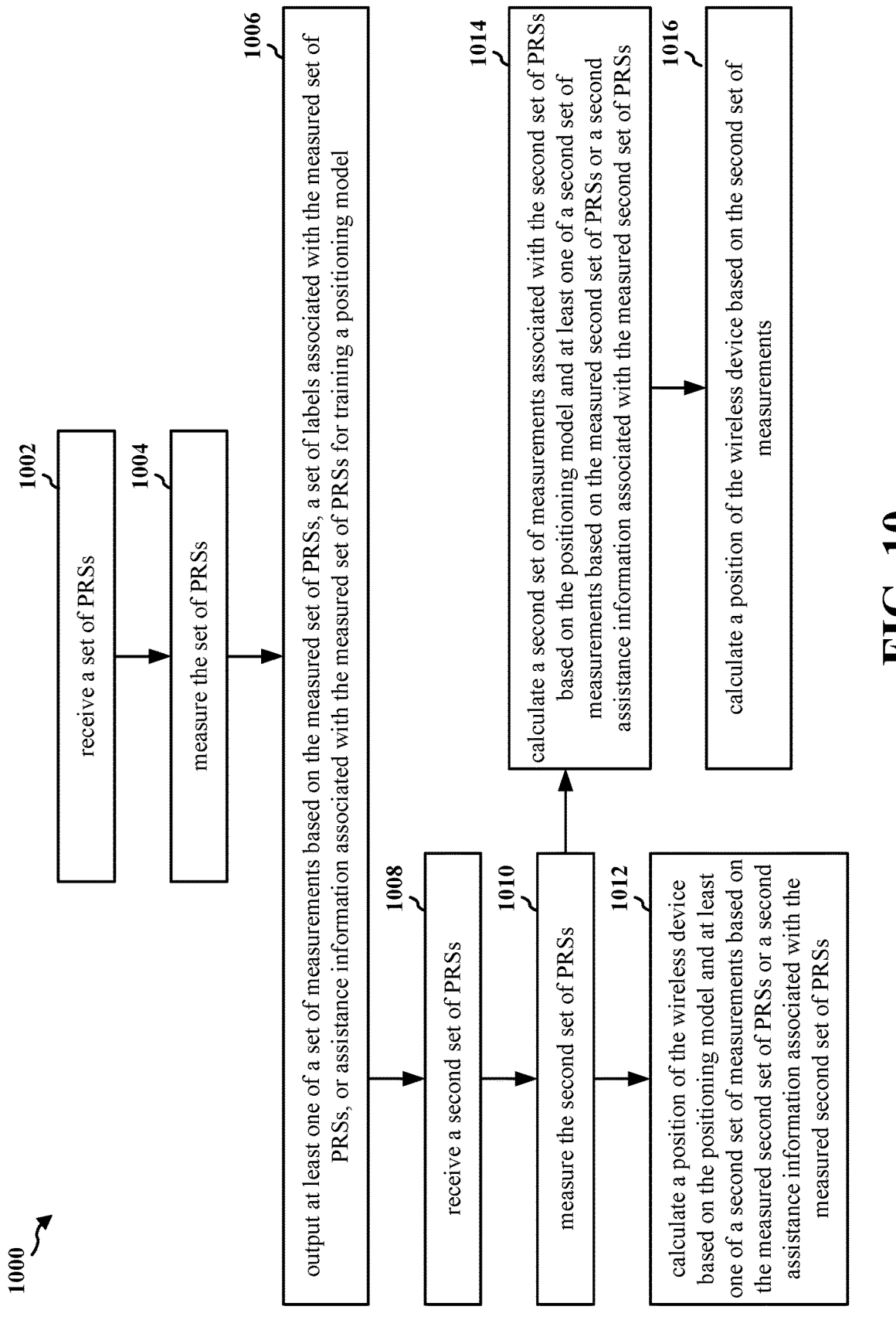
FIG. 10 is a flowchart of a method of wireless communication.

FIG. 10 is a flowchart 1000 of a method of wireless
communication. The method may be performed by a wire-
less device (e.g., the UE 104, the UE 350; the wireless
device 404, the wireless device 504; the positioning target
wireless device 602; the positioning target wireless device
702; the apparatus 1404). At 1002, the wireless device may
receive a set of PRSs. For example, 1002 may be performed
by the positioning target wireless device 602 in FIG. 6,
which may receive the set of positioning signals 624 trans-
mitted from the set of positioning neighbor wireless devices
604 to the positioning target wireless device 602. The set of
positioning signals 624 may include a set of PRSs. More-
over, 1002 may be performed by the component 198 in FIG.
1, 3, or 14.

At 1004, the wireless device may measure the set of PRSs.
For example, 1004 may be performed by the positioning
target wireless device 602 in FIG. 6, which may, at 626,
measure the set of positioning signals 624. Moreover, 1004
may be performed by the component 198 in FIG. 1, 3, or 14.

At 1006, the wireless device may output at least one of a
set of measurements based on the measured set of PRSs, a
set of labels associated with the measured set of PRSs, or
assistance information associated with the measured set of
PRSs for training a positioning model. For example, 1006
may be performed by the positioning target wireless device
602 in FIG. 6, which may, at 640, train a positioning model
based on the set of measurements taken at 626 of the set of
positioning signals 624. The positioning target wireless
device 602 may, at 640, train a positioning model based on
a set of labels calculated at the positioning target wireless device 602 at 634 or received from the positioning network entity 606 as the positioning feedback 638. The positioning target wireless device 602 may, at 640, train a positioning model based on assistance information received from the positioning network entity 606 as the positioning feedback 632 or the positioning feedback 638. In another example, 1006 may be performed by the positioning target wireless device 702 in FIG. 7, which may transmit the set of measurements taken at 726 of the set of positioning signals 724 as the positioning feedback 738 to the positioning network entity 706. The positioning target wireless device 702 in FIG. 7 may transmit a set of labels calculated at the positioning target wireless device 702 at 734 as the positioning feedback 738 to the positioning network entity 706. The positioning target wireless device 702 in FIG. 7 may transmit assistance information associated with measuring the set of positioning signals 724 at 726 as the positioning feedback 738 to the positioning network entity 706. The positioning network entity 706 may use the positioning feedback 738 to train the positioning model at 740. Moreover, 1006 may be performed by the component 198 in FIG. 1, 3, or 14.

At 1008, the wireless device may receive a second set of PRSs. For example, 1008 may be performed by the positioning target wireless device 602 in FIG. 6, which may receive the set of positioning signals 624 with a subsequent positioning configuration 616. Moreover, 1008 may be performed by the component 198 in FIG. 1, 3, or 14.

At 1010, the wireless device may measure the second set of PRSs. For example, 1010 may be performed by the positioning target wireless device 602 in FIG. 6, which may, at 626, measure the set of positioning signals 624. Moreover, 1010 may be performed by the component 198 in FIG. 1, 3, or 14.

At 1012, the wireless device may calculate a position of the wireless device based on the positioning model and at least one of a second set of measurements based on the measured second set of PRSs or a second assistance information associated with the measured second set of PRSs. For example, 1012 may be performed by the positioning target wireless device 602 in FIG. 6, which may, at 634, calculate a position of the positioning target wireless device 602 based on the positioning model and at least one of a second set of measurements based on the set of positioning signals 624 measured at 626 and/or a second assistance information associated with the set of positioning signals 624 received as the positioning feedback 632. Moreover, 1012 may be performed by the component 198 in FIG. 1, 3, or 14.

At 1014, the wireless device may calculate a second set of measurements associated with the second set of PRSs based on the positioning model and at least one of a second set of measurements based on the measured second set of PRSs or a second assistance information associated with the measured second set of PRSs. For example, 1014 may be performed by the positioning target wireless device 602 in FIG. 6, which may, at 626, calculate a second set of measurements associated with on the set of positioning signals 624 based on the positioning model trained at 640 and at least one of a second set of measurements based on the set of positioning signals 624 measured at 626 or a second assistance information received as the positioning feedback 632 associated with the set of positioning signals 624. Moreover, 1014 may be performed by the component 198 in FIG. 1, 3, or 14.

At 1016, the wireless device may calculate a position of the wireless device based on the second set of measurements. For example, 1016 may be performed by the positioning target wireless device 602 in FIG. 6, which may calculate a position of the positioning target wireless device 602 based on measurements of the set of positioning signals 624 after the positioning model has been trained at 640. Moreover, 1016 may be performed by the component 198 in FIG. 1, 3, or 14.

Figure 11:
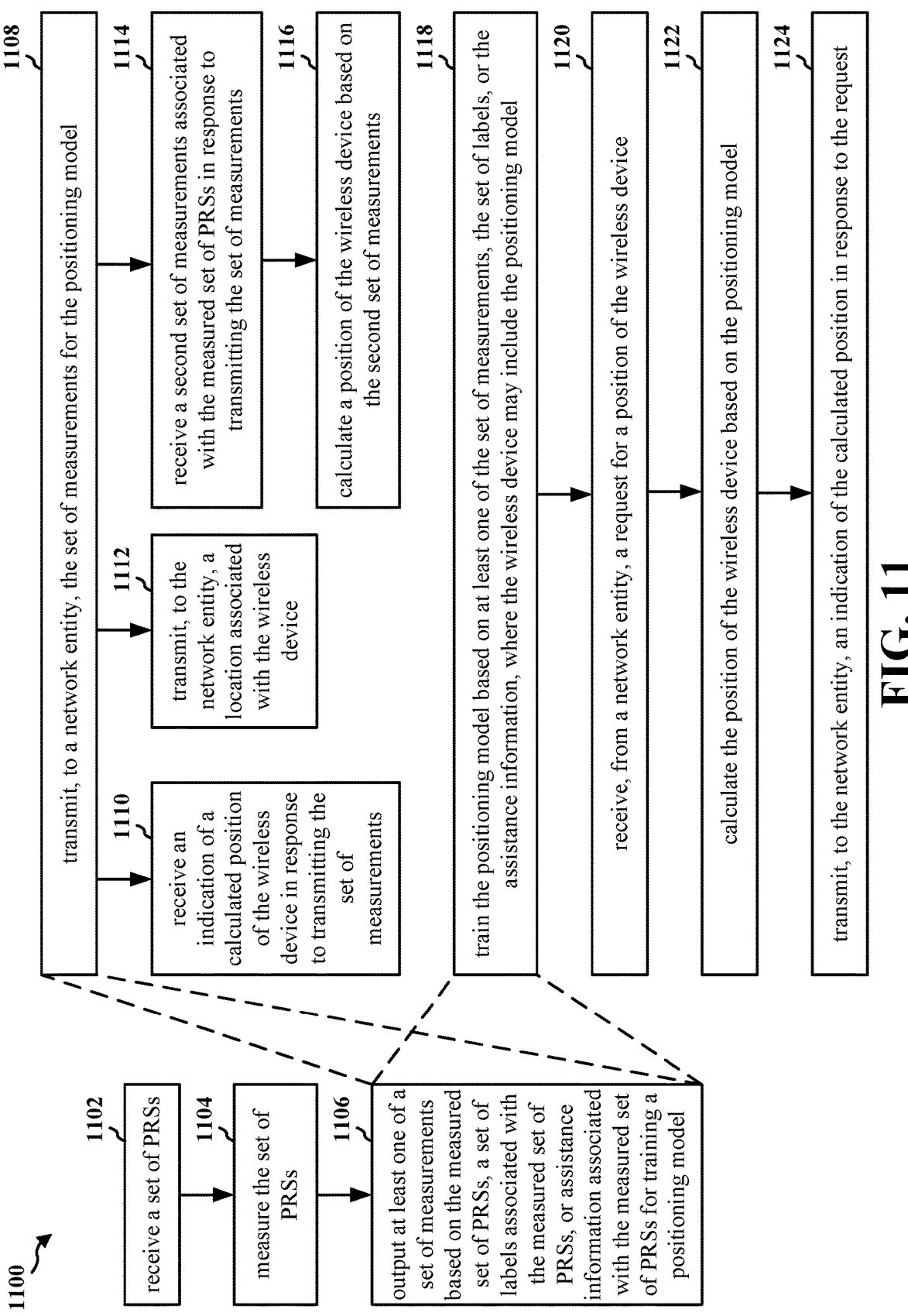
FIG. 11 is a flowchart of a method of wireless communication.

FIG. 11 is a flowchart 1100 of a method of wireless communication. The method may be performed by a wireless device (e.g., the UE 104, the UE 350; the wireless device 404, the wireless device 504; the positioning target wireless device 602; the positioning target wireless device 702; the apparatus 1404). At 1102, the wireless device may receive a set of PRSs. For example, 1102 may be performed by the positioning target wireless device 602 in FIG. 6, which may receive the set of positioning signals 624 transmitted from the set of positioning neighbor wireless devices 604 to the positioning target wireless device 602. The set of positioning signals 624 may include a set of PRSs. Moreover, 1102 may be performed by the component 198 in FIG. 1, 3, or 14.

At 1104, the wireless device may measure the set of PRSs. For example, 1104 may be performed by the positioning target wireless device 602 in FIG. 6, which may, at 626, measure the set of positioning signals 624. Moreover, 1104 may be performed by the component 198 in FIG. 1, 3, or 14.

At 1106, the wireless device may output at least one of a set of measurements based on the measured set of PRSs, a set of labels associated with the measured set of PRSs, or assistance information associated with the measured set of PRSs for training a positioning model. For example, 1106 may be performed by the positioning target wireless device 602 in FIG. 6, which may, at 640, train a positioning model based on the set of measurements taken at 626 of the set of positioning signals 624. The positioning target wireless device 602 may, at 640, train a positioning model based on a set of labels calculated at the positioning target wireless device 602 at 634 or received from the positioning network entity 606 as the positioning feedback 638. The positioning target wireless device 602 may, at 640, train a positioning model based on assistance information received from the positioning network entity 606 as the positioning feedback 632 or the positioning feedback 638. In another example, 1106 may be performed by the positioning target wireless device 702 in FIG. 7, which may transmit the set of measurements taken at 726 of the set of positioning signals 724 as the positioning feedback 738 to the positioning network entity 706. The positioning target wireless device 702 in FIG. 7 may transmit a set of labels calculated at the positioning target wireless device 702 at 734 as the positioning feedback 738 to the positioning network entity 706. The positioning target wireless device 702 in FIG. 7 may transmit assistance information associated with measuring the set of positioning signals 724 at 726 as the positioning feedback 738 to the positioning network entity 706. The positioning network entity 706 may use the positioning feedback 738 to train the positioning model at 740. Moreover, 1106 may be performed by the component 198 in FIG. 1, 3, or 14.

At 1108, the wireless device may transmit, to a network entity, the set of measurements for the positioning model. For example, 1108 may be performed by the positioning target wireless device 602 in FIG. 6, which may transmit, to the positioning network entity 606, the set of measurements for the positioning model as the positioning feedback 632 and/or the positioning feedback 638. Moreover, 1108 may be performed by the component 198 in FIG. 1, 3, or 14.

At 1110, the wireless device may receive an indication of a calculated position of the wireless device in response to transmitting the set of measurements. For example, 1110 may be performed by the positioning target wireless device 602 in FIG. 6, which may receive, as the positioning feedback 638, an indication of a calculated position of the positioning target wireless device 602 calculated at 636 in response to transmitting the set of measurements as the positioning feedback 632. Moreover, 1110 may be performed by the component 198 in FIG. 1, 3, or 14.

At 1112, the wireless device may transmit, to the network entity, a location associated with the wireless device. For example, 1112 may be performed by the positioning target wireless device 702 in FIG. 7, which may transmit, to the positioning network entity 706, a location, calculated at 734, associated with the positioning target wireless device 702 as the positioning feedback 738. Moreover, 1112 may be performed by the component 198 in FIG. 1, 3, or 14.

At 1114, the wireless device may receive a second set of measurements associated with the measured set of PRSs in response to transmitting the set of measurements. For example, 1114 may be performed by the positioning target wireless device 602 in FIG. 6, which may receive a second set of measurements as the positioning feedback 638 associated with the set of positioning signals 624 measured at 626 in response to transmitting the set of measurements as the positioning feedback 632. Moreover, 1114 may be performed by the component 198 in FIG. 1, 3, or 14.

At 1116, the wireless device may calculate a position of the wireless device based on the second set of measurements. For example, 1116 may be performed by the positioning target wireless device 602 in FIG. 6, which may, at 634, calculate a position of the positioning target wireless device 602 based on the second set of measurements received as the positioning feedback 638. The positioning target wireless device 602 may continue to calculate labels at 634 based on the feedback. Moreover, 1116 may be performed by the component 198 in FIG. 1, 3, or 14.

At 1118, the wireless device may train the positioning model based on at least one of the set of measurements, the set of labels, or the assistance information, where the wireless device may include the positioning model. For example, 1118 may be performed by the positioning target wireless device 602 in FIG. 6, which may, at 640, train the positioning model based on at least one of the set of measurements measured at 626, the set of labels calculated at 634 and/or at 636, and/or the assistance information received as the positioning feedback 632 and/or the positioning feedback 638. The positioning target wireless device 602 may include the positioning model. Moreover, 1118 may be performed by the component 198 in FIG. 1, 3, or 14.

At 1120, the wireless device may receive, from a network entity, a request for a position of the wireless device. For example, 1120 may be performed by the positioning target wireless device 602 in FIG. 6, which may receive, from the positioning network entity 606, a request for a position of the positioning target wireless device 602 based on the positioning model trained at 640. Moreover, 1120 may be performed by the component 198 in FIG. 1, 3, or 14.

At 1122, the wireless device may calculate the position of the wireless device based on the positioning model. For example, 1122 may be performed by the positioning target wireless device 602 in FIG. 6, which may calculate the position of the positioning target wireless device 602 based on the positioning model trained at 640. Moreover, 1122 may be performed by the component 198 in FIG. 1, 3, or 14.

At 1124, the wireless device may transmit, to the network entity, an indication of the calculated position in response to the request. For example, 1124 may be performed by the positioning target wireless device 602 in FIG. 6, which may transmit, to the positioning network entity 606, an indication of the calculated position in response to the request from the positioning network entity 606. Moreover, 1124 may be performed by the component 198 in FIG. 1, 3, or 14.

FIG. 12 is a flowchart 1200 of a method of wireless communication. The method may be performed by a network entity (e.g., the base station 102, the base station 310; the LMF 166, the one or more location servers 168; the wireless device 402, the wireless device 406, the wireless device 502, the wireless device 506, the set of positioning neighbor wireless devices 604, the set of positioning neighbor wireless devices 704; the network entity 508, the positioning network entity 606, the positioning network entity 706, the network entity 1402, the network entity 1502, the network entity 1660). At 1202, the network entity may transmit, for a first wireless device, a first positioning schedule for measuring a set of PRSs. For example, 1202 may be performed by the positioning network entity 706 in FIG. 7, which may transmit, for the positioning target wireless device 702, a first positioning schedule as the set of positioning configurations 714 to the set of positioning neighbor wireless devices 704 or the positioning configuration 718 to the positioning target wireless device 702. The first positioning schedule may be for measuring the set of positioning signals 724. The set of positioning signals 724 may include a set of PRSs. Moreover, 1202 may be performed by the component 199 in FIG. 1, 3, 15, or 16.

At 1204, the network entity may transmit, for at least one of the first wireless device or a second wireless device, a second positioning schedule for transmitting the set of PRSs. For example, 1204 may be performed by the positioning network entity 706 in FIG. 7, which may transmit, for the positioning target wireless device 702 and the set of positioning neighbor wireless devices 704, a second positioning schedule as the set of positioning configurations 714 for transmitting the set of positioning signals 724. The set of positioning signals 724 may include a set of PRSs. Moreover, 1204 may be performed by the component 199 in FIG. 1, 3, 15, or 16.

At 1206, the network entity may transmit, for the first wireless device, an indication to output at least one of a set of measurements based on the set of PRSs, a set of labels associated with the set of PRSs, or assistance information associated with the set of PRSs for training a positioning model. For example, 1206 may be performed by the positioning network entity 706 in FIG. 7, which may transmit, for the positioning target wireless device 702, a data collection configuration 710 to transmit the set of measurements taken at 726 to the positioning network entity 706 as the positioning feedback 732 or the positioning feedback 738. The positioning network entity 706 may transmit, for the positioning target wireless device 702, a data collection configuration 710 to transmit the set of labels calculated at 734 to the positioning network entity 706 as the positioning feedback 738. The positioning network entity 706 may transmit, for the positioning target wireless device 702, a data collection configuration 710 to transmit assistance information to the positioning network entity 706 as the positioning feedback 732 or the positioning feedback 738. Moreover, 1206 may be performed by the component 199 in FIG. 1, 3, 15, or 16.

Figure 13:
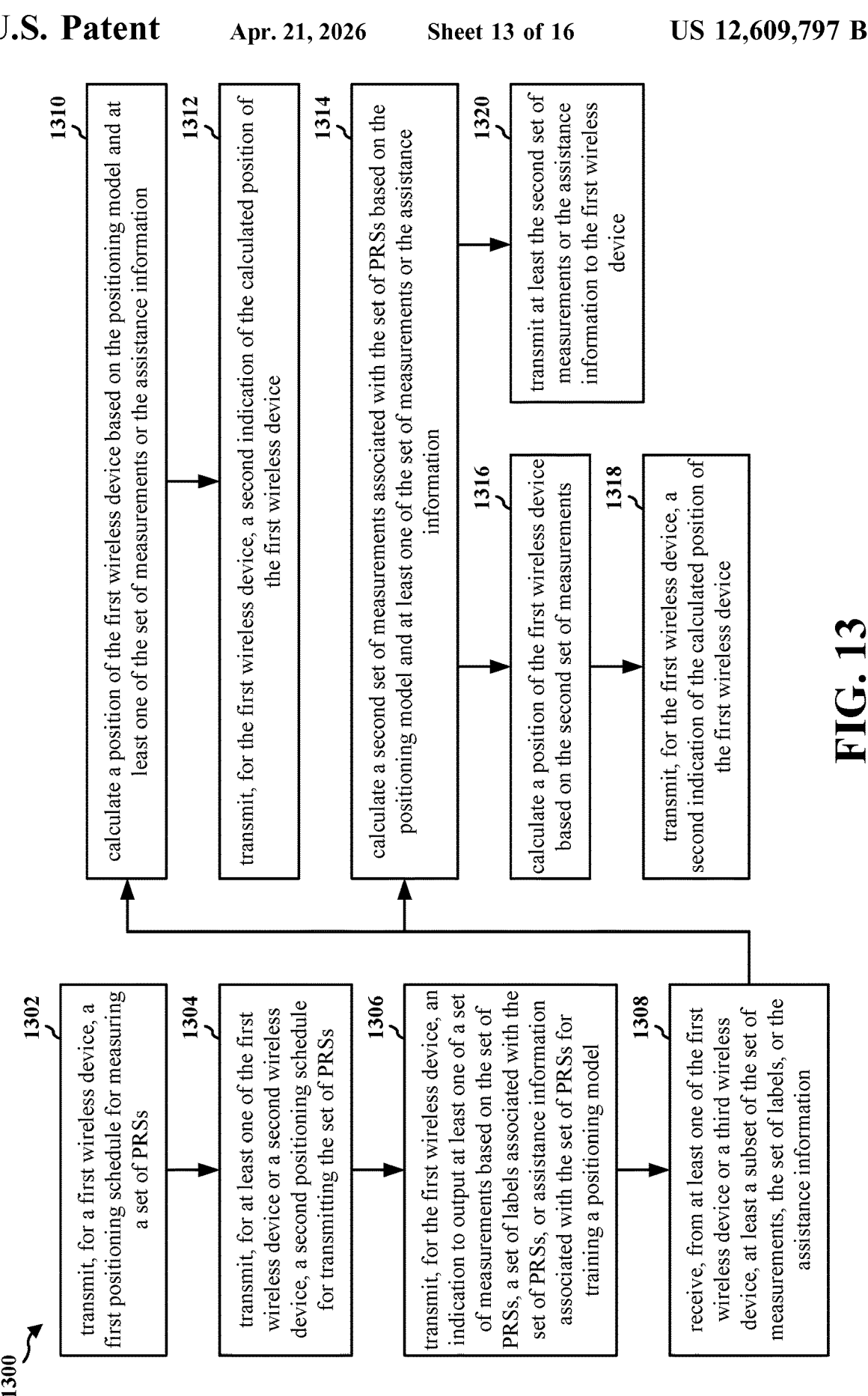
FIG. 13 is a flowchart of a method of wireless communication.

FIG. 13 is a flowchart 1300 of a method of wireless communication. The method may be performed by a network entity (e.g., the base station 102, the base station 310; the LMF 166, the one or more location servers 168; the wireless device 402, the wireless device 406, the wireless device 502, the wireless device 506, the set of positioning neighbor wireless devices 604, the set of positioning neighbor wireless devices 704; the network entity 508, the positioning network entity 606, the positioning network entity 706, the network entity 1402, the network entity 1502, the network entity 1660). At 1302, the network entity may transmit, for a first wireless device, a first positioning schedule for measuring a set of PRSs. For example, 1302 may be performed by the positioning network entity 706 in FIG. 7, which may transmit, for the positioning target wireless device 702, a first positioning schedule as the set of positioning configurations 714 to the set of positioning neighbor wireless devices 704 or the positioning configuration 718 to the positioning target wireless device 702. The first positioning schedule may be for measuring the set of positioning signals 724. The set of positioning signals 724 may include a set of PRSs. Moreover, 1302 may be performed by the component 199 in FIG. 1, 3, 15, or 16.

At 1304, the network entity may transmit, for at least one of the first wireless device or a second wireless device, a second positioning schedule for transmitting the set of PRSs. For example, 1304 may be performed by the positioning network entity 706 in FIG. 7, which may transmit, for the positioning target wireless device 702 and the set of positioning neighbor wireless devices 704, a second positioning schedule as the set of positioning configurations 714 for transmitting the set of positioning signals 724. The set of positioning signals 724 may include a set of PRSs. Moreover, 1304 may be performed by the component 199 in FIG. 1, 3, 15, or 16.

At 1306, the network entity may transmit, for the first wireless device, an indication to output at least one of a set of measurements based on the set of PRSs, a set of labels associated with the set of PRSs, or assistance information associated with the set of PRSs for training a positioning model. For example, 1306 may be performed by the positioning network entity 706 in FIG. 7, which may transmit, for the positioning target wireless device 702, a data collection configuration 710 to transmit the set of measurements taken at 726 to the positioning network entity 706 as the positioning feedback 732 or the positioning feedback 738. The positioning network entity 706 may transmit, for the positioning target wireless device 702, a data collection configuration 710 to transmit the set of labels calculated at 734 to the positioning network entity 706 as the positioning feedback 738. The positioning network entity 706 may transmit, for the positioning target wireless device 702, a data collection configuration 710 to transmit assistance information to the positioning network entity 706 as the positioning feedback 732 or the positioning feedback 738. Moreover, 1306 may be performed by the component 199 in FIG. 1, 3, 15, or 16.

At 1308, the network entity may receive, from at least one of the first wireless device or a third wireless device, at least a subset of the set of measurements, the set of labels, or the assistance information. For example, 1308 may be performed by the positioning network entity 706 in FIG. 7, which may receive, from at least one of the first wireless device or a third wireless device, at least a subset of the set of measurements, the set of labels, or the assistance information. Moreover, 1308 may be performed by the component 199 in FIG. 1, 3, 15, or 16.

At 1310, the network entity may calculate a position of the first wireless device based on the positioning model and at least one of the set of measurements or the assistance information. For example, 1310 may be performed by the positioning network entity 706 in FIG. 7, which may calculate a position of the first wireless device based on the positioning model and at least one of the set of measurements or the assistance information. Moreover, 1310 may be performed by the component 199 in FIG. 1, 3, 15, or 16.

At 1312, the network entity may transmit, for the first wireless device, a second indication of the calculated position of the first wireless device. For example, 1312 may be performed by the positioning network entity 706 in FIG. 7, which may transmit, for the first wireless device, a second indication of the calculated position of the first wireless device. Moreover, 1312 may be performed by the component 199 in FIG. 1, 3, 15, or 16.

At 1314, the network entity may calculate a second set of measurements associated with the set of PRSs based on the positioning model and at least one of the set of measurements or the assistance information. For example, 1314 may be performed by the positioning network entity 706 in FIG. 7, which may calculate a second set of measurements associated with the set of PRSs based on the positioning model and at least one of the set of measurements or the assistance information. Moreover, 1314 may be performed by the component 199 in FIG. 1, 3, 15, or 16.

At 1316, the network entity may calculate a position of the first wireless device based on the second set of measurements. For example, 1316 may be performed by the positioning network entity 706 in FIG. 7, which may calculate a position of the first wireless device based on the second set of measurements. Moreover, 1316 may be performed by the component 199 in FIG. 1, 3, 15, or 16.

At 1318, the network entity may transmit, for the first wireless device, a second indication of the calculated position of the first wireless device. For example, 1318 may be performed by the positioning network entity 706 in FIG. 7, which may transmit, for the first wireless device, a second indication of the calculated position of the first wireless device. Moreover, 1318 may be performed by the component 199 in FIG. 1, 3, 15, or 16.

At 1320, the network entity may transmit at least the second set of measurements or the assistance information to the first wireless device. For example, 1320 may be performed by the positioning network entity 706 in FIG. 7, which may transmit at least the second set of measurements or the assistance information to the first wireless device. Moreover, 1320 may be performed by the component 199 in FIG. 1, 3, 15, or 16.

Figure 14:
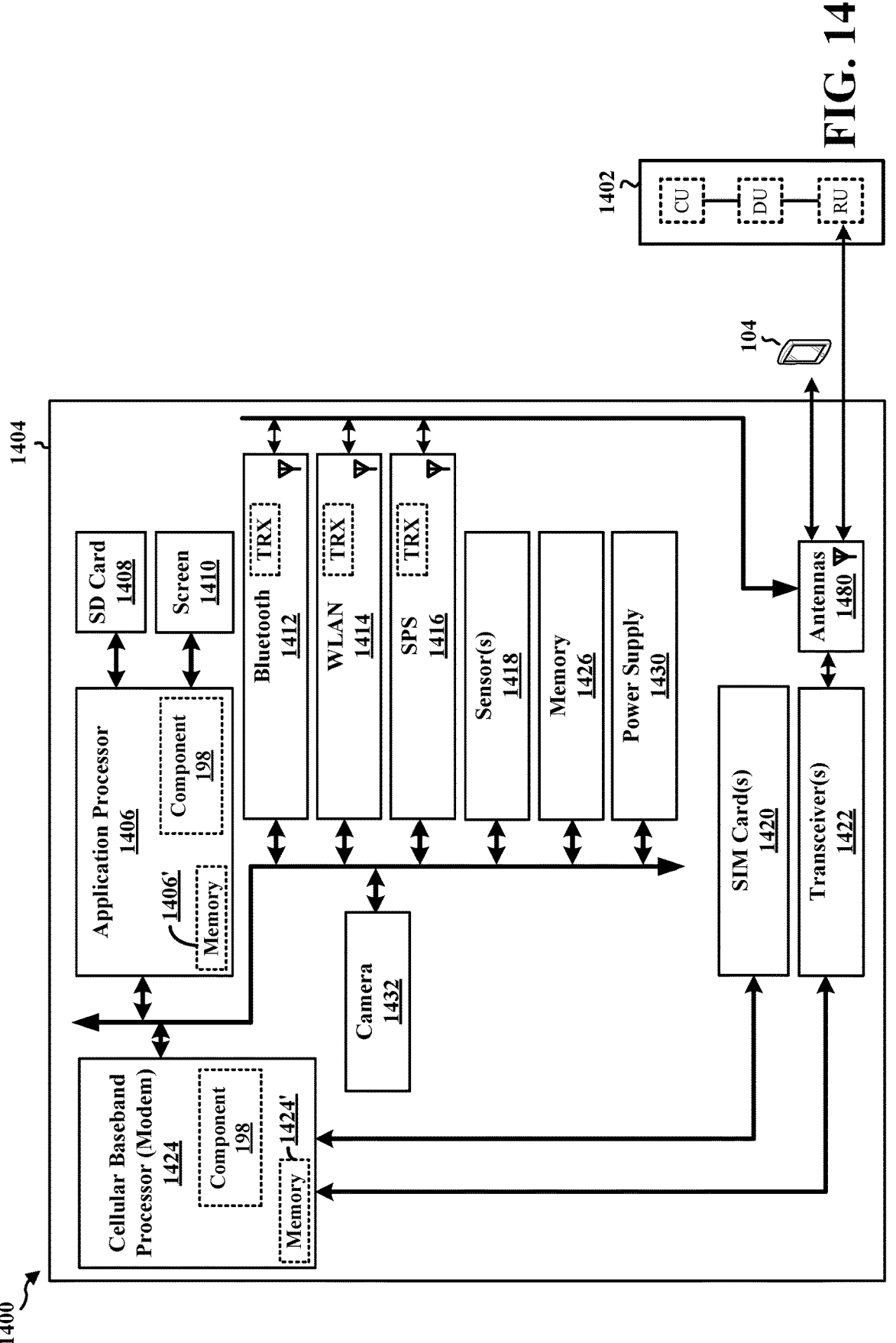
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see UE 350 of FIG. 3) and include the additional modules of the apparatus 1404.

As discussed supra, the component 198 may be configured to receive a set of PRSs. The component 198 may be configured to measure the set of PRSs. The component 198 may be configured to output at least one of a set of measurements based on the measured set of PRSs, a set of labels associated with the measured set of PRSs, or assistance information associated with the measured set of PRSs for training a positioning model. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, may include means for receiving a set of PRSs. The apparatus 1404 may include means for measuring the set of PRSs. The apparatus 1404 may include means for outputting at least one of a set of measurements based on the measured set of PRSs, a set of labels associated with the measured set of PRSs, or assistance information associated with the measured set of PRSs for training a positioning model. The positioning model may be an AI/ML model. The set of measurements may include at least one of (a) an RSTD measurement between a first sensing signal of the set of PRSs and a second sensing signal of the set of PRSs, (b) a first range of a set of RSTD measurements of a first subset of the set of PRSs, (c) a first distribution of the first range, (d) an RSRP measurement of at least one of the set of PRSs, (c) a second range of a set of RSRP measurements of a second subset of the set of PRSs, (f) a second distribution of the second range, (g) a RSRPP measurement of at least one of the set of PRSs, (h) a third range of a set of RSRPP measurements of a third subset of the set of PRSs, (i) a third distribution of the third range, (j) an AoD) of at least one of the set of PRSs, (k) a fourth range of a set of AoD measurements of a fourth subset of the set of PRSs, (l) a fourth distribution of the fourth range, (m) a LOS path based on at least one of the set of PRSs, (n) a phase of the LOS path, (o) a reflection path based on at least one of the set of PRSs, (p) a CIR measurement based on at least one of the set of PRSs, (q) a CFR measurement based on at least one of the set of PRSs, (r) a PDP measurement based on at least one of the set of PRSs, or(s) a LOS indication based on at least one of the set of PRSs. The set of labels may include an indication of a position of the apparatus 1404. The apparatus 1404 may include means for receiving a set of signals via at least one of a LIDAR device, a GNSS device, or a WLAN antenna. The apparatus 1404 may include means for calculating the position of the apparatus 1404 based on the set of signals. The apparatus 1404 may include means for receiving at least a subset of the set of labels. The subset of the set of labels may include a second set of measurements based on the set of PRSs. The apparatus 1404 may include means for receiving at least a first subset of the set of labels or a second subset of the assistance information. The apparatus 1404 may include means for transmitting a request for at least the first subset of the set of labels or the second subset of the assistance information. The apparatus 1404 may include means for receiving at least the first subset of the set of labels or the second subset of the assistance information in response to receiving the request. The assistance information may include at least one of (a) a BWP associated with the set of PRSs, (b) a number of TRPs associated with the set of PRSs, (c) a location associated with at least one TRP associated with the set of PRSs, (d) a PRS configuration associated with the set of PRSs, (c) a frame number associated with the set of PRSs, (f) a slot index associated with the set of PRSs, (g) an OFDM symbol associated with the set of PRSs, (h) a hyper frame number associated with the set of PRSs, (i) a UTC associated with the set of PRSs, (j) a first indication of an implementation error, (k) a resource mapping associated with the set of PRSs, (l) a second indication of a first quality of a label, or (m) a third indication of a second quality of a measurement of the set of PRSs. The apparatus 1404 may include means for receiving a second set of PRSs. The method comprises measuring the second set of PRSs. The apparatus 1404 may include means for calculating a position of the apparatus 1404 based on the positioning model and at least one of a second set of measurements based on the measured second set of PRSs or a second assistance information associated with the measured second set of PRSs. The apparatus 1404 may include means for receiving a second set of PRSs. The apparatus 1404 may include means for measuring the second set of PRSs. The apparatus 1404 may include means for calculating a second set of measurements associated with the second set of PRSs based on the positioning model and at least one of a second set of measurements based on the measured second set of PRSs or a second assistance information associated with the measured second set of PRSs. The apparatus 1404 may include means for calculating a position of the apparatus 1404 based on the second set of measurements. The apparatus 1404 may include means for outputting the set of measurements by transmitting, to a network entity, the set of measurements for the positioning model. The apparatus 1404 may include means for receiving an indication of a calculated position of the apparatus 1404 in response to transmitting the set of measurements. The apparatus 1404 may include means for receiving a second set of measurements associated with the measured set of PRSs in response to transmitting the set of measurements. The apparatus 1404 may include means for calculating a position of the apparatus 1404 based on the second set of measurements. The apparatus 1404 may include means for transmitting, to the network entity, a location associated with the apparatus 1404. The apparatus 1404 may include means for receiving a second set of measurements associated with the measured set of PRSs in response to transmitting the set of measurements and the location associated with the apparatus 1404, the network entity may include an LMF. The apparatus 1404 may include the positioning model, for example as a part of the component 198. The apparatus 1404 may include means for outputting at least one of the set of measurements, the set of labels, or the assistance information by training the positioning model based on at least one of the set of measurements, the set of labels, or the assistance information. The apparatus 1404 may include means for receiving, from a network entity, a request for a position of the apparatus 1404. The apparatus 1404 may include means for calculating the position of the apparatus 1404 based on the positioning model. The apparatus 1404 may include means for transmitting, to the network entity, an indication of the calculated position in response to the request. The apparatus 1404 may include a UE or a PRU. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
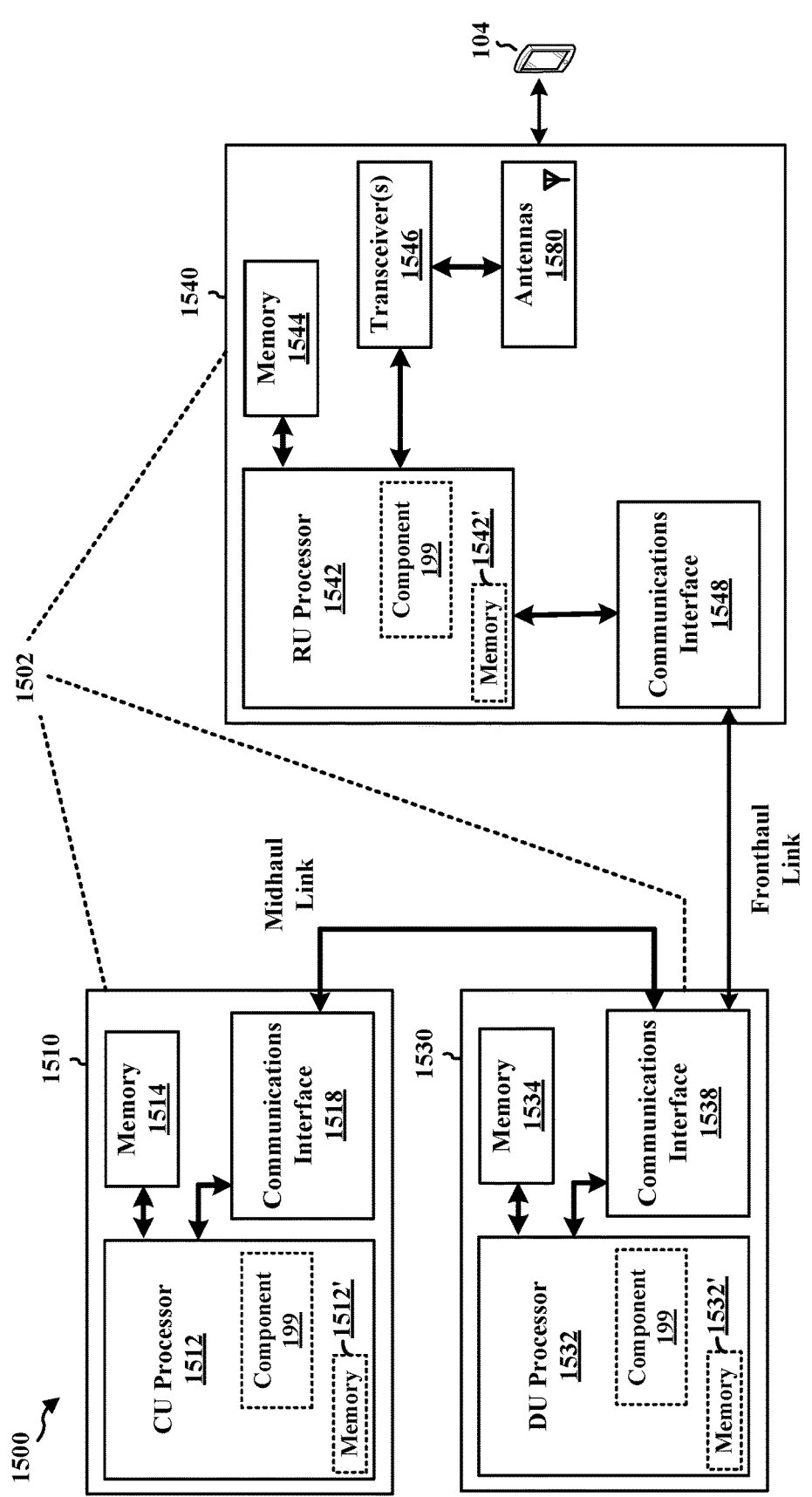
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

Figure 16:
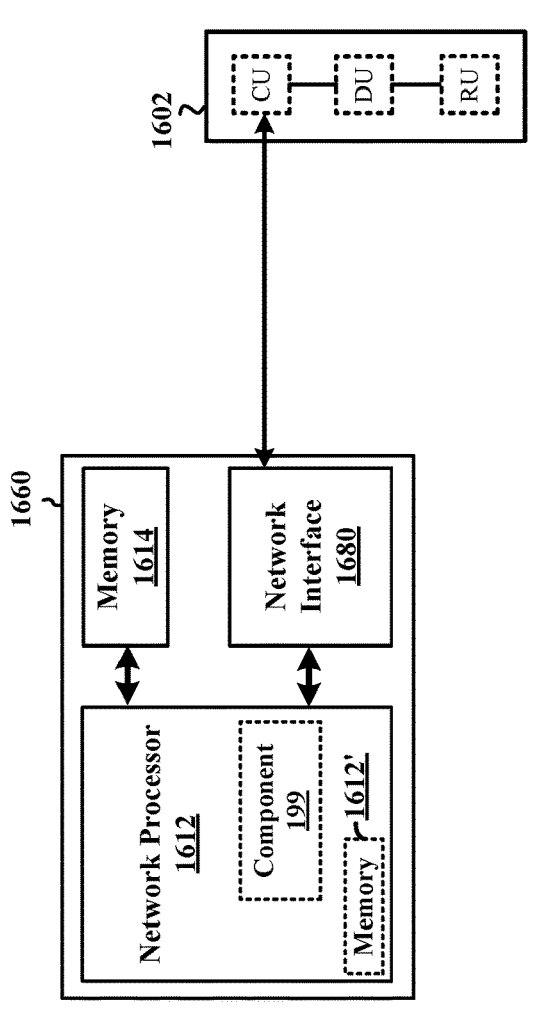
FIG. 16 is a diagram illustrating an example of a hardware implementation for an example network entity.

As discussed supra, the component 199 may be configured to transmit, for a first wireless device, a first positioning schedule for measuring a set of PRSs. The component 199 may be configured to transmit, for at least one of the first wireless device or a second wireless device, a second positioning schedule for transmitting the set of PRSs. The component 199 may be configured to transmit, for the first wireless device, an indication to output at least one of a set of measurements based on the set of PRSs, a set of labels associated with the set of PRSs, or assistance information associated with the set of PRSs for training a positioning model. The network entity 1502 may include a network entity, such as an LMF or a set of location servers. The component 199 may be configured to transmit, for at least one of the first wireless device or a second wireless device, a second positioning schedule for transmitting the set of PRSs. The component 199 may be configured to transmit, for the first wireless device, an indication to output at least one of a set of measurements based on the set of PRSs, a set of labels associated with the set of PRSs, or assistance information associated with the set of PRSs for training a positioning model. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 may include means for transmitting, for a first wireless device, a first positioning schedule for measuring a set of PRSs. The network entity 1502 may include means for transmitting, for at least one of the first wireless device or a second wireless device, a second positioning schedule for transmitting the set of PRSs. The network entity 1502 may include means for transmitting, for the first wireless device, an indication to output at least one of a set of measurements based on the set of PRSs, a set of labels associated with the set of PRSs, or assistance information associated with the set of PRSs for training a positioning model. The network entity 1502 may include an LMF. The set of measurements may include at least one of (a) an RSTD measurement between a first sensing signal of the set of PRSs and a second sensing signal of the set of PRSs. (b) a first range of a set of RSTD measurements of a first subset of the set of PRSs, (c) a first distribution of the first range, (d) an RSRP measurement of at least one of the set of PRSs, (c) a second range of a set of RSRP measurements of a second subset of the set of PRSs, (f) a second distribution of the second range, (g) an RSRPP measurement of at least one of the set of PRSs, (h) a third range of a set of RSRPP measurements of a third subset of the set of PRSs, (i) a third distribution of the third range, (j) an AoD of at least one of the set of PRSs, (k) a fourth range of a set of AoD measurements of a fourth subset of the set of PRSs, (l) a fourth distribution of the fourth range, (m) an LOS path based on at least one of the set of PRSs. (n) a phase of the LOS path, (o) a reflection path based on at least one of the set of PRSs, (p) a CIR measurement based on at least one of the set of PRSs, (q) a CFR measurement based on at least one of the set of PRSs, or (r) a PDP measurement based on at least one of the set of PRSs. The set of labels may include at least one of an indication of a position of the first wireless device or a second set of measurements based on the set of PRSs. The assistance information may include at least one of (a) a BWP associated with the set of PRSs, (b) a number of TRPs associated with the set of PRSs, (c) a location associated with at least one TRP associated with the set of PRSs, (d) a PRS configuration associated with the set of PRSs, (c) a frame number associated with the set of PRSs, (f) a slot index associated with the set of PRSs, (g) an OFDM symbol associated with the set of PRSs, (h) a hyper frame number associated with the set of PRSs, (i) a UTC associated with the set of PRSs. (j) a first indication of an implementation error, (k) a resource mapping associated with the set of PRSs, (l) a second indication of a first quality of a label, or (m) a third indication of a second quality of a measurement of the set of PRSs. The network entity 1502 may include means for receiving, from at least one of the first wireless device or a third wireless device, at least a subset of the set of measurements, the set of labels, or the assistance information. The network entity 1502 may include means for calculating a position of the first wireless device based on the positioning model and at least one of the set of measurements or the assistance information. The network entity 1502 may include means for transmitting, for the first wireless device, a second indication of the calculated position of the first wireless device. The network entity 1502 may include means for calculating a second set of measurements associated with the set of PRSs based on the positioning model and at least one of the set of measurements or the assistance information. The network entity 1502 may include means for calculating a position of the first wireless device based on the second set of measurements. The network entity 1502 may include means for transmitting, for the first wireless device, a second indication of the calculated position of the first wireless device. The network entity 1502 may include means for transmitting at least the second set of measurements or the assistance information to the first wireless device. The network entity 1502 may include means for receiving a request for at least the second set of measurements or the assistance information. The network entity 1502 may include means for transmitting at least the second set of measurements or the assistance information in response to receiving the request. The first wireless device may include a UE or a PRU. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means. FIG. 16 is a diagram 1600 illustrating an example of a hardware implementation for a network entity 1660. In one example, the network entity 1660 may be within the core network 120. The network entity 1660 may include a network processor 1612. The network processor 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The processor 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, for a first wireless device, a first positioning schedule for measuring a set of PRSs. The component 199 may be configured to transmit, for at least one of the first wireless device or a second wireless device, a second positioning schedule for transmitting the set of PRSs. The component 199 may be configured to transmit, for the first wireless device, an indication to output at least one of a set of measurements based on the set of PRSs, a set of labels associated with the set of PRSs, or assistance information associated with the set of PRSs for training a positioning model. The component 199 may be within the processor 1612. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1660 may include a variety of components configured for various functions. In one configuration, the network entity 1660 may include means for transmitting, for a first wireless device, a first positioning schedule for measuring a set of PRSs. The network entity 1660 may include means for transmitting, for at least one of the first wireless device or a second wireless device, a second positioning schedule for transmitting the set of PRSs. The network entity 1660 may include means for transmitting, for the first wireless device, an indication to output at least one of a set of measurements based on the set of PRSs, a set of labels associated with the set of PRSs, or assistance information associated with the set of PRSs for training a positioning model. The network entity 1660 may include an LMF. The set of measurements may include at least one of (a) an RSTD measurement between a first sensing signal of the set of PRSs and a second sensing signal of the set of PRSs, (b) a first range of a set of RSTD measurements of a first subset of the set of PRSs, (c) a first distribution of the first range, (d) an RSRP measurement of at least one of the set of PRSs, (e) a second range of a set of RSRP measurements of a second subset of the set of PRSs, (f) a second distribution of the second range, (g) an RSRPP measurement of at least one of the set of PRSs, (h) a third range of a set of RSRPP measurements of a third subset of the set of PRSs, (i) a third distribution of the third range, (j) an AoD of at least one of the set of PRSs, (k) a fourth range of a set of AoD measurements of a fourth subset of the set of PRSs, (l) a fourth distribution of the fourth range, (m) an LOS path based on at least one of the set of PRSs, (n) a phase of the LOS path, (o) a reflection path based on at least one of the set of PRSs, (p) a CIR measurement based on at least one of the set of PRSs, (q) a CFR measurement based on at least one of the set of PRSs, or (r) a PDP measurement based on at least one of the set of PRSs. The set of labels may include at least one of an indication of a position of the first wireless device or a second set of measurements based on the set of PRSs. The assistance information may include at least one of (a) a BWP associated with the set of PRSs, (b) a number of TRPs associated with the set of PRSs, (c) a location associated with at least one TRP associated with the set of PRSs, (d) a PRS configuration associated with the set of PRSs, (c) a frame number associated with the set of PRSs, (f) a slot index associated with the set of PRSs, (g) an OFDM symbol associated with the set of PRSs, (h) a hyper frame number associated with the set of PRSs, (i) a UTC associated with the set of PRSs. (j) a first indication of an implementation error, (k) a resource mapping associated with the set of PRSs, (l) a second indication of a first quality of a label, or (m) a third indication of a second quality of a measurement of the set of PRSs. The network entity 1660 may include means for receiving, from at least one of the first wireless device or a third wireless device, at least a subset of the set of measurements, the set of labels, or the assistance information. The network entity 1660 may include means for calculating a position of the first wireless device based on the positioning model and at least one of the set of measurements or the assistance information. The network entity 1660 may include means for transmitting, for the first wireless device, a second indication of the calculated position of the first wireless device. The network entity 1660 may include means for calculating a second set of measurements associated with the set of PRSs based on the positioning model and at least one of the set of measurements or the assistance information. The network entity 1660 may include means for calculating a position of the first wireless device based on the second set of measurements. The network entity 1660 may include means for transmitting, for the first wireless device, a second indication of the calculated position of the first wireless device. The network entity 1660 may include means for transmitting at least the second set of measurements or the assistance information to the first wireless device. The network entity 1660 may include means for receiving a request for at least the second set of measurements or the assistance information. The network entity 1660 may include means for transmitting at least the second set of measurements or the assistance information in response to receiving the request. The first wireless device may include a UE or a PRU. The means may be the component 199 of the network entity 1660 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a device that transmits the data, or may output the data to a module or a component of the device for processing the data. A device configured to "obtain" data, such as a transmission, signal, or message, may receive the data, for example with a transceiver, may obtain the data from a device that receives the data, or may retrieve the data from a module or a component of the device to process the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, wherein the method comprises receiving a set of positioning reference signals (PRSs). The method comprises measuring the set of PRSs. The method comprises outputting at least one of a set of measurements based on the measured set of PRSs, a set of labels associated with the measured set of PRSs, or assistance information associated with the measured set of PRSs for training a positioning model. The positioning model may be an AI/ML model.

Aspect 2 is the method of aspect 1, wherein the set of measurements comprises at least one of (a) a reference signal time difference (RSTD) measurement between a first sensing signal of the set of PRSs and a second sensing signal of the set of PRSs, (b) a first range of a set of RSTD measurements of a first subset of the set of PRSs, (c) a first distribution of the first range, (d) a reference signal received power (RSRP) measurement of at least one of the set of PRSs, (e) a second range of a set of RSRP measurements of a second subset of the set of PRSs, (f) a second distribution of the second range, (g) a reference signal received power path (RSRPP) measurement of at least one of the set of PRSs, (h) a third range of a set of RSRPP measurements of a third subset of the set of PRSs, (i) a third distribution of the third range, (j) an angle of departure (AoD) of at least one of the set of PRSs, (k) a fourth range of a set of AoD measurements of a fourth subset of the set of PRSs, (l) a fourth distribution of the fourth range, (m) a line-of-sight (LOS) path based on at least one of the set of PRSs. (n) a phase of the LOS path, (o) a reflection path based on at least one of the set of PRSs. (p) a channel impulse response (CIR) measurement based on at least one of the set of PRSs. (q) a channel frequency response (CFR) measurement based on at least one of the set of PRSs, or (r) a power delay profile (PDP) measurement based on at least one of the set of PRSs.

Aspect 3 is the method of either of aspects 1 or 2, wherein the set of labels comprises an indication of a position of the wireless device.

Aspect 4 is the method of aspect 3, wherein the method comprises receiving a set of signals via at least one of a light and detection ranging (LIDAR) device, a global navigation satellite system (GNSS) device, or a wireless local area network (WLAN) antenna. The method comprises calculating the position of the wireless device based on the set of signals.

Aspect 5 is the method of any of aspects 1 to 4, wherein the method comprises receiving at least a subset of the set of labels, wherein the subset of the set of labels comprises a second set of measurements based on the set of PRSs.

Aspect 6 is the method of any of aspects 1 to 5, wherein the method comprises receiving at least a first subset of the set of labels or a second subset of the assistance information.

Aspect 7 is the method of any of aspects 1 to 6, wherein the method comprises transmitting a request for at least the first subset of the set of labels or the second subset of the assistance information, wherein receiving at least the first subset of the set of labels or the second subset of the assistance information is in response to receiving the request.

Aspect 8 is the method of any of aspects 1 to 7, wherein the assistance information comprises at least one of (a) a bandwidth part (BWP) associated with the set of PRSs, (b) a number of transmission reception points (TRPs) associated with the set of PRSs, (c) a location associated with at least one TRP associated with the set of PRSs, (d) a PRS configuration associated with the set of PRSs, (c) a frame number associated with the set of PRSs, (f) a slot index associated with the set of PRSs. (g) an orthogonal frequency-division multiplexing (OFDM) symbol associated with the set of PRSs, (h) a hyper frame number associated with the set of PRSs, (i) a coordinated universal time (UTC) associated with the set of PRSs, (j) a first indication of an implementation error, (k) a resource mapping associated with the set of PRSs, (l) a second indication of a first quality of a label, or (m) a third indication of a second quality of a measurement of the set of PRSs.

Aspect 9 is the method of any of aspects 1 to 8, wherein the method comprises receiving a second set of PRSs. The method comprises measuring the second set of PRSs. The method comprises calculating a position of the wireless device based on the positioning model and at least one of a second set of measurements based on the measured second set of PRSs or a second assistance information associated with the measured second set of PRSs.

Aspect 10 is the method of any of aspects 1 to 9, wherein the method comprises receiving a second set of PRSs. The method comprises measuring the second set of PRSs. The method comprises calculating a second set of measurements associated with the second set of PRSs based on the positioning model and at least one of a second set of measurements based on the measured second set of PRSs or a second assistance information associated with the measured second set of PRSs.

Aspect 11 is the method of aspect 10, wherein the method comprises calculating a position of the wireless device based on the second set of measurements.

Aspect 12 is the method of any of aspects 1 to 11, wherein outputting the set of measurements comprises transmitting, to a network entity, the set of measurements for the positioning model.

Aspect 13 is the method of aspect 12, wherein the method comprises receiving an indication of a calculated position of the wireless device in response to transmitting the set of measurements.

Aspect 14 is the method of either of aspects 12 or 13, wherein the method comprises receiving a second set of measurements associated with the measured set of PRSs in response to transmitting the set of measurements.

Aspect 15 is the method of aspect 14, wherein the method comprises calculating a position of the wireless device based on the second set of measurements.

Aspect 16 is the method of any of aspects 12 to 15, wherein the method comprises transmitting, to the network entity, a location associated with the wireless device. The method comprises receiving a second set of measurements associated with the measured set of PRSs in response to transmitting the set of measurements and the location associated with the wireless device.

Aspect 17 is the method of any of aspects 12 to 16, wherein the network entity comprises a location management function (LMF).

Aspect 18 is the method of any of aspects 1 to 17, wherein the wireless device includes the positioning model, wherein outputting at least one of the set of measurements, the set of labels, or the assistance information comprises training the positioning model based on at least one of the set of measurements, the set of labels, or the assistance information.

Aspect 19 is the method of aspect 18, wherein the method comprises receiving, from a network entity, a request for a position of the wireless device. The method comprises calculating the position of the wireless device based on the positioning model. The method comprises transmitting, to the network entity, an indication of the calculated position in response to the request.

Aspect 20 is the method of any of aspects 1 to 19, wherein the wireless device comprises a user equipment (UE) or a positioning reference unit (PRU).

Aspect 21 is a method of wireless communication at a network entity, wherein the method comprises transmitting, for a first wireless device, a first positioning schedule for measuring a set of positioning reference signals (PRSs). The method comprises transmitting, for at least one of the first wireless device or a second wireless device, a second positioning schedule for transmitting the set of PRSs. The method comprises transmitting, for the first wireless device, an indication to output at least one of a set of measurements based on the set of PRSs, a set of labels associated with the set of PRSs, or assistance information associated with the set of PRSs for training a positioning model.

Aspect 22 is the method of aspect 21, wherein the network entity comprises an LMF.

Aspect 23 is the method of either of aspects 21 or 22, wherein the set of measurements comprises at least one of (a) an reference signal time difference (RSTD) measurement between a first sensing signal of the set of PRSs and a second sensing signal of the set of PRSs. (b) a first range of a set of RSTD measurements of a first subset of the set of PRSs, (c) a first distribution of the first range, (d) a reference signal received power (RSRP) measurement of at least one of the set of PRSs, (e) a second range of a set of RSRP measurements of a second subset of the set of PRSs, (f) a second distribution of the second range, (g) a reference signal received power path (RSRPP) measurement of at least one of the set of PRSs, (h) a third range of a set of RSRPP measurements of a third subset of the set of PRSs, (i) a third distribution of the third range, (j) an angle of departure (AoD) of at least one of the set of PRSs, (k) a fourth range of a set of AoD measurements of a fourth subset of the set of PRSs, (l) a fourth distribution of the fourth range, (m) a line-of-sight (LOS) path based on at least one of the set of PRSs. (n) a phase of the LOS path, (o) a reflection path based on at least one of the set of PRSs, (p) a channel impulse response (CIR) measurement based on at least one of the set of PRSs, (q) a channel frequency response (CFR) measurement based on at least one of the set of PRSs, or (r) a power delay profile (PDP) measurement based on at least one of the set of PRSs.

Aspect 24 is the method of any of aspects 21 to 23, wherein the set of labels comprises at least one of a second indication of a position of the first wireless device or a second set of measurements based on the set of PRSs.

Aspect 25 is the method of any of aspects 21 to 24, wherein the assistance information comprises at least one of (a) a bandwidth part (BWP) associated with the set of PRSs, (b) a number of transmission reception points (TRPs) associated with the set of PRSs, (c) a location associated with at least one TRP associated with the set of PRSs. (d) a PRS configuration associated with the set of PRSs, (c) a frame number associated with the set of PRSs, (f) a slot index associated with the set of PRSs, (g) an OFDM symbol associated with the set of PRSs, (h) a hyper frame number associated with the set of PRSs, (i) a coordinated universal time (UTC) associated with the set of PRSs, (j) a first indication of an implementation error, (k) a resource mapping associated with the set of PRSs, (l) a second indication of a first quality of a label, or (m) a third indication of a second quality of a measurement of the set of PRSs.

Aspect 26 is the method of any of aspects 21 to 25, wherein the method comprises receiving, from at least one of the first wireless device or a third wireless device, at least a subset of the set of measurements, the set of labels, or the assistance information.

Aspect 27 is the method of aspect 26, wherein the method comprises calculating a position of the first wireless device based on the positioning model and at least one of the set of measurements or the assistance information.

Aspect 28 is the method of aspect 27, wherein the method comprises transmitting, for the first wireless device, a second indication of the calculated position of the first wireless device.

Aspect 29 is the method of any of aspects 26 to 28, wherein the method comprises calculating a second set of measurements associated with the set of PRSs based on the positioning model and at least one of the set of measurements or the assistance information.

Aspect 30 is the method of any of aspects 21 to 29, wherein the method comprises calculating a position of the first wireless device based on the second set of measurements. The method comprises transmitting, for the first wireless device, a second indication of the calculated position of the first wireless device.

Aspect 31 is the method of either of aspects 29 or 30, wherein the method comprises transmitting at least the second set of measurements or the assistance information to the first wireless device.

Aspect 32 is the method of aspect 31, wherein the method comprises receiving a request for at least the second set of measurements or the assistance information. Transmitting at least the second set of measurements or the assistance information may be in response to receiving the request.

Aspect 33 is the method of any of aspects 21 to 32, wherein the first wireless device comprises a user equipment (UE) or a positioning reference unit (PRU).

Aspect 34 is an apparatus for wireless communication, including: a memory; and at least one processor coupled to the memory and, based at least in part on information stored in the memory, the at least one processor is configured to implement any of aspects 1 to 28.

Aspect 35 is the apparatus of aspect 34, further including at least one of an antenna or a transceiver coupled to the at least one processor.

Aspect 36 is an apparatus for wireless communication including means for implementing any of aspects 1 to 33.

Aspect 37 is a computer-readable medium (e.g., a non-transitory computer-readable medium) storing computer executable code, wherein the code, when executed by a processor, causes the processor to implement any of aspects 1 to 33.

What is claimed is:

1. An apparatus for wireless communication at a wireless device, comprising:
   a memory; and
   at least one processor coupled to the memory and, based at least in part on information stored in the memory, the at least one processor is configured to:
      receive a set of positioning reference signals (PRSs);
      measure the set of PRSs;
      receive a set of labels comprising a set of measurements based on the set of PRSs; and
      output the measured set of PRSs and the set of labels for training a positioning model.

2. The apparatus of claim 1, wherein the set of measurements comprises at least one of:
   a reference signal time difference (RSTD) measurement between a first signal of the set of PRSs and a second signal of the set of PRSs;

a first range of a set of RSTD measurements of a first subset of the set of PRSs;

a first distribution of the first range;

a reference signal received power (RSRP) measurement of at least one of the set of PRSs;

a second range of a set of RSRP measurements of a second subset of the set of PRSs;

a second distribution of the second range;

a reference signal received power path (RSRPP) measurement of at least one of the set of PRSs;

a third range of a set of RSRPP measurements of a third subset of the set of PRSs;

a third distribution of the third range;

an angle of departure (AoD) of at least one of the set of PRSs;

a fourth range of a set of AoD measurements of a fourth subset of the set of PRSs;

a fourth distribution of the fourth range;

a line-of-sight (LOS) path based on at least one of the set of PRSs;

a phase of the LOS path;

a reflection path based on at least one of the set of PRSs;

a channel impulse response (CIR) measurement based on at least one of the set of PRSs;

a channel frequency response (CFR) measurement based on at least one of the set of PRSs; or a power delay profile (PDP) measurement based on at least one of the set of PRSs.

3. The apparatus of claim 1, wherein the at least one processor is further configured to:

transmit a request for at least the set of labels before a reception of the set of labels.

4. The apparatus of claim 1, wherein the at least one processor is further configured to:

receive a set of assistance information associated with the measured set of PRSs, wherein the assistance information comprises at least one of:

a frame number associated with the set of PRSs;

a slot index associated with the set of PRSs;

an orthogonal frequency-division multiplexing (OFDM) symbol associated with the set of PRSs;

a hyper frame number associated with the set of PRSs;

a coordinated universal time (UTC) associated with the set of PRSs; or a second indication of an implementation error.

5. The apparatus of claim 1, wherein the at least one processor is further configured to:

receive a second set of PRSs;

measure the second set of PRSs; and calculate a position of the wireless device based on the positioning model and the measured second set of PRSs.

6. The apparatus of claim 1, wherein the at least one processor is further configured to:

receive a second set of PRSs;

measure the second set of PRSs; and calculate a second set of measurements associated with the second set of PRSs based on the positioning model and the measured second set of PRSs.

7. The apparatus of claim 6, wherein the at least one processor is further configured to:

calculate a position of the wireless device based on the calculated second set of measurements.

8. The apparatus of claim 1, wherein, to output the set of measurements and the set of labels, the at least one processor is configured to:

transmit, to a network entity, the set of measurements and the set of labels for the positioning model.

9. The apparatus of claim 8, wherein the at least one processor is further configured to:

receive a second indication of a calculated position of the wireless device after a transmission of the set of measurements and the set of labels.

10. The apparatus of claim 8, wherein the at least one processor is further configured to:

receive a second set of measurements associated with the measured set of PRSs after a transmission of the set of measurements and the set of labels.

11. The apparatus of claim 10, wherein the at least one processor is further configured to:

calculate a position of the wireless device based on the received second set of measurements.

12. The apparatus of claim 8, wherein the at least one processor is further configured to:

transmit, to the network entity, a location associated with the wireless device.

13. The apparatus of claim 8, wherein the network entity comprises a location management function (LMF).

14. The apparatus of claim 1, wherein the wireless device comprises the positioning model, and wherein, to output the measured set of PRSs and the set of labels, the at least one processor is configured to:

train the positioning model based on the measured set of PRSs and the set of labels.

15. The apparatus of claim 14, wherein the at least one processor is further configured to:

receive, from a network entity, a request for a position of the wireless device;

calculate the position of the wireless device based on the positioning model; and transmit, to the network entity, a second indication of the calculated position in response to the request.

16. The apparatus of claim 1, wherein the wireless device comprises a user equipment (UE) or a positioning reference unit (PRU).

17. The apparatus of claim 1, wherein the set of measurements based on the set of PRSs comprises at least one of:

a reference signal time difference (RSTD) measurement between a first signal of the set of PRSs and a second signal of the set of PRSs;

a first range of a set of RSTD measurements of a first subset of the set of PRSs;

a first distribution of the first range;

a reference signal received power (RSRP) measurement of at least one of the set of PRSs;

a second range of a set of RSRP measurements of a second subset of the set of PRSs;

a second distribution of the second range;

a reference signal received power path (RSRPP) measurement of at least one of the set of PRSs;

a third range of a set of RSRPP measurements of a third subset of the set of PRSs;

a third distribution of the third range;

an angle of departure (AoD) of at least one of the set of PRSs;

a fourth range of a set of AoD measurements of a fourth subset of the set of PRSs;

a fourth distribution of the fourth range;

a line-of-sight (LOS) path based on at least one of the set of PRSs;

a phase of the LOS path;

a reflection path based on at least one of the set of PRSs;

a channel impulse response (CIR) measurement based on at least one of the set of PRSs;

a channel frequency response (CFR) measurement based on at least one of the set of PRSs; or a power delay profile (PDP) measurement based on at least one of the set of PRSs.

18. The apparatus of claim 1, wherein the at least one processor is further configured to:

receive a set of assistance information associated with the set of labels; and output the set of assistance information for training the positioning model.

19. The apparatus of claim 18, wherein the set of assistance information comprises at least one of:

a first indication of a quality of a label of the set of labels; or a second indication of a set of reference signal resources used to obtain the label of the set of labels.

20. The apparatus of claim 19, wherein the first indication of the quality of the label of the set of labels comprises an indicator that the label is associated with a quality metric greater or equal to a threshold.

21. The apparatus of claim 19, wherein the second indication of the set of reference signal resources comprises at least one of:

a frame number associated with a reference signal resource of the set of reference signal resources;

a slot index associated with the reference signal resource;

an ODFM symbol associated with the reference signal resource;

a hyper frame number associated with the reference signal resource; or a coordinated universal time (UTC) associated with the reference signal resource.

22. The apparatus of claim 19, wherein the second indication of the set of reference signal resources comprises beam information associated with a reference signal resource of the set of reference signal resources.

23. An apparatus for wireless communication at a network entity, comprising:

a memory; and at least one processor coupled to the memory and, based at least in part on information stored in the memory, the at least one processor is configured to:

transmit, for a first wireless device, a first positioning schedule for measuring a set of positioning reference signals (PRSs);

transmit, for a second wireless device, a second positioning schedule for transmitting the set of PRSs; and transmit, for the first wireless device, a set of labels comprising a set of measurements based on the set of PRSs for training a positioning model.

24. The apparatus of claim 23, wherein the at least one processor is further configured to:

receive, from at least one of the first wireless device or a third wireless device, a second set of measurements of the set of PRSs based on the positioning model.

25. The apparatus of claim 24, wherein the at least one processor is further configured to:

calculate a position of the first wireless device based on the received second set of measurements of the set of PRSs; and transmit, for the first wireless device, a second indication of the calculated position of the first wireless device.

26. The apparatus of claim 24, wherein the at least one processor is further configured to:

calculate a third set of measurements associated with the set of PRSs based on the received second set of measurements of the set of PRSs.

27. The apparatus of claim 26, wherein the at least one processor is further configured to:

calculate a position of the first wireless device based on the calculated third set of measurements; and transmit, for the first wireless device, a second indication of the calculated position of the first wireless device.

28. The apparatus of claim 26, further comprising a transceiver coupled to the at least one processor, wherein the at least one processor is further configured to:

transmit, via the transceiver, the calculated third set of measurements.

29. A method of wireless communication at a wireless device, comprising:

receiving a set of positioning reference signals (PRSs);

measuring the set of PRSs;

receiving, from a network entity, a set of labels comprising a set of measurements based on the set of PRSs; and outputting the measured set of PRSs and the set of labels for training a positioning model.

30. A method of wireless communication at a network entity, comprising:

transmitting, for a first wireless device, a first positioning schedule for measuring a set of positioning reference signals (PRSs);

transmitting, for a second wireless device, a second positioning schedule for transmitting the set of PRSs; and transmitting, for the first wireless device, a set of labels comprising a set of measurements based on the set of PRSs for training a positioning model.

* * * * *